US011541859B2

(12) United States Patent
Jeong et al.

(10) Patent No.: US 11,541,859 B2
(45) Date of Patent: Jan. 3, 2023

(54) ELECTRIC BRAKE SYSTEM AND OPERATING METHOD OF THEREOF

(71) Applicant: MANDO CORPORATION, Gyeonggi-do (KR)

(72) Inventors: Hyojin Jeong, Gyeonggi-do (KR); Seong Ho Choi, Gyeonggi-do (KR); Jin Seok Kim, Gyeonggi-do (KR); Byung Ki Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 862 days.

(21) Appl. No.: 16/395,237

(22) Filed: Apr. 26, 2019

(65) Prior Publication Data

US 2019/0329751 A1 Oct. 31, 2019

(30) Foreign Application Priority Data

| Apr. 26, 2018 | (KR) | 10-2018-0048456 |
| Apr. 26, 2018 | (KR) | 10-2018-0048461 |
| May 30, 2018 | (KR) | 10-2018-0061882 |

(51) Int. Cl.
*B60T 13/66* (2006.01)
*B60T 8/1755* (2006.01)
(Continued)

(52) U.S. Cl.
CPC .......... *B60T 13/662* (2013.01); *B60T 8/1755* (2013.01); *B60T 8/4081* (2013.01); *B60T 13/686* (2013.01); *B60T 13/745* (2013.01); *B60T 15/028* (2013.01)

(58) Field of Classification Search
CPC .... B60T 13/662; B60T 8/1755; B60T 8/4081; B60T 13/686; B60T 13/745; B60T 15/028
(Continued)

(56) References Cited

U.S. PATENT DOCUMENTS

| 2004/0004392 A1* | 1/2004 | Kusano | B60T 13/148 |
| | | | 303/114.1 |
| 2013/0213023 A1* | 8/2013 | Eckstein | F01P 7/044 |
| | | | 60/459 |

(Continued)

FOREIGN PATENT DOCUMENTS

| EP | 2 520 473 | 11/2012 |
| JP | 2010-126037 | 6/2010 |

(Continued)

*Primary Examiner* — Yazan A Soofi
(74) *Attorney, Agent, or Firm* — Ladas & Parry, LLP

(57) ABSTRACT

An electronic brake system and a method for operating the same are disclosed. The electronic brake system includes an integrated master cylinder, a hydraulic-pressure supply device, and a hydraulic control unit. The integrated master cylinder allows a brake fluid to be discharged based on displacement of a brake pedal and at the same time provides proper pedal feel for the user. The hydraulic-pressure supply device generates hydraulic pressure by operating a hydraulic piston in response to an electrical signal that is output in response to displacement of the brake pedal. The hydraulic control unit controls hydraulic pressure of brake fluid supplied to respective wheel cylinders. The electronic brake system operates in different ways according to a normal operation mode and an abnormal operation mode.

15 Claims, 13 Drawing Sheets

(51) Int. Cl.
 *B60T 8/40* (2006.01)
 *B60T 13/68* (2006.01)
 *B60T 13/74* (2006.01)
 *B60T 15/02* (2006.01)

(58) Field of Classification Search
 USPC .......................................................... 701/78
 See application file for complete search history.

(56) References Cited

U.S. PATENT DOCUMENTS

| | | | |
|---|---|---|---|
| 2013/0213025 A1* | 8/2013 | Linden | B60T 8/4018 60/533 |
| 2015/0035353 A1* | 2/2015 | Drumm | B60T 8/4063 303/15 |
| 2015/0097418 A1* | 4/2015 | Koo | B60T 11/20 303/14 |
| 2015/0166028 A1* | 6/2015 | Kim | B60T 8/4081 303/10 |
| 2017/0106846 A1* | 4/2017 | Kim | B60T 11/232 |
| 2022/0055600 A1* | 2/2022 | Georgin | B60T 8/1703 |
| 2022/0089132 A1* | 3/2022 | Cheon | B60T 8/171 |

FOREIGN PATENT DOCUMENTS

| | | |
|---|---|---|
| JP | 2010-137617 | 6/2010 |
| JP | 5126039 | 1/2013 |
| KR | 10-2015-0055644 | 5/2015 |

\* cited by examiner

ELECTRIC BRAKE SYSTEM AND OPERATING METHOD OF THEREOF

CROSS-REFERENCE TO RELATED APPLICATION

This application is based on and claims priority under 35 U.S.C. § 119 to Korean Patent Application No. 10-2018-0048456, filed on Apr. 26, 2018, Korean Patent Application No. 10-2018-0048461, filed on Apr. 26, 2018, and Korean Patent Application No. 10-2018-0061882, filed on May 30, 2018 in the Korean Intellectual Property Office, the disclosures of which are incorporated herein by reference in their entireties.

BACKGROUND

1. Field

Embodiments of the present disclosure relate to an electronic brake system, and more particularly to an electronic brake system for generating braking force using an electrical signal corresponding to a displacement of a brake pedal.

2. Description of the Related Art

A brake system for braking of a vehicle is essentially mounted to the vehicle, and various systems have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Conventionally, when a driver depresses a brake pedal, a conventional brake system is designed to supply hydraulic pressure needed for braking to wheel cylinders using a booster mechanically connected to the brake pedal. An electronic brake system provided with a hydraulic-pressure supply device has recently been developed and rapidly come into widespread use. Once a driver pushes a brake pedal, the hydraulic-pressure supply device of the electronic brake system senses a displacement of the brake pedal through a pedal displacement sensor, and receives an electrical signal indicating the driver's braking intention from the pedal displacement sensor, such that hydraulic pressure needed for braking is supplied to wheel cylinders.

CITED REFERENCE

Patent Document
European Registered Patent No. EP 2 520 473 A1 (Honda Motor Co., Ltd.), (Nov. 7, 2012)

SUMMARY

Therefore, it is an aspect of the present disclosure to provide an electronic brake system for integrating a master cylinder and a simulation device into one body to reduce the number of constituent components, resulting in implementation of a product having a smaller size and a lighter weight.

It is another aspect of the present disclosure to provide an electronic brake system for efficiently braking a vehicle in various driving situations.

It is another aspect of the present disclosure to provide an electronic brake system for stably generating high brake pressure.

It is another aspect of the present disclosure to provide an electronic brake system for improving performance and operational stability of a product.

It is another aspect of the present disclosure to provide an electronic brake system for improving durability of a product by reducing load applied to constituent components of the product, and a method for operating the same.

It is another aspect of the present disclosure to provide an electronic brake system for improving ease of assembly and productivity of a product, resulting in reduction in product costs.

Additional aspects of the disclosure will be set forth in part in the description which follows and, in part, will be obvious from the description, or may be learned by practice of the disclosure.

In accordance with an aspect of the present disclosure, an electronic brake system includes a reservoir configured to store a brake fluid therein, an integrated master cylinder connected to a brake pedal and configured to include a master chamber and a master piston, a hydraulic-pressure supply device configured to generate a hydraulic pressure by operating a hydraulic piston using an electrical signal that is output in response to a displacement of the brake pedal, and to include not only a first pressure chamber disposed at one side of the hydraulic piston movably disposed in a cylinder block, but also a second pressure chamber disposed at the other side of the hydraulic piston and connected to at least one wheel cylinder, a hydraulic control unit configured to include not only a first hydraulic circuit to control hydraulic pressure flowing from the hydraulic-pressure supply device to two wheel cylinders, but also a second hydraulic circuit to control hydraulic pressure flowing from the hydraulic-pressure supply device to two other wheel cylinders, a first dump passage configured to connect the first pressure chamber to the reservoir, a second dump passage configured to connect the second pressure chamber to the reservoir, a first dump valve provided in the first dump passage so as to control flow of the brake fluid, and a second dump valve provided in the second dump passage so as to control flow of the brake fluid.

The electronic brake system may further include a first dump check valve connected parallel to the first dump valve on the first dump passage, and configured to allow only unidirectional flow of the brake fluid flowing from the reservoir to the first pressure chamber, and a second dump check valve connected parallel to the second dump valve on the second dump passage, and configured to allow only unidirectional flow of the brake fluid flowing from the reservoir to the second pressure chamber.

The hydraulic control unit may include a first hydraulic passage configured to communicate with the first pressure chamber, second and third hydraulic passages branched from the first hydraulic passage and respectively connected to the first and second hydraulic circuits, a fourth hydraulic passage configured to communicate with the second pressure chamber and connected to the second hydraulic passage, a fifth hydraulic passage configured to connect the second hydraulic passage to the third hydraulic passage, and a sixth hydraulic passage configured to connect the second hydraulic passage to the fifth hydraulic passage.

The hydraulic control unit may include a first control valve provided in the second hydraulic passage so as to control flow of the brake fluid, a second control valve provided in the third hydraulic passage so as to control flow of the brake fluid, a third control valve provided in the fourth hydraulic passage so as to control flow of the brake fluid, a fourth control valve disposed between one point connected to the sixth hydraulic passage and another point connected to the second hydraulic passage on the fifth hydraulic passage, and a fifth control valve provided in the sixth hydraulic passage.

The hydraulic control unit may further include a seventh hydraulic passage configured to communicate with the second pressure chamber and connected to the third hydraulic passage, and a sixth control valve provided in the seventh hydraulic passage.

Each of the third to fifth control valves may be provided as a solenoid valve controlling bidirectional flow of the brake fluid. The first control valve may be provided as a check valve that allows only flow of the brake fluid flowing from the first pressure chamber to the first hydraulic circuit. The second control valve may be provided as a check valve that allows only flow of the brake fluid flowing from the first pressure chamber to the second hydraulic circuit. The sixth control valve may be provided as a check valve that allows only flow of the brake fluid flowing from the second pressure chamber to the second hydraulic circuit.

The master piston may be provided in the master chamber and configured to provide displacement changeable by the brake pedal. The integrated master cylinder may further include first and second simulation chambers, a reaction force piston provided in the first simulation chamber to provide displacement changeable by hydraulic pressure of the brake fluid stored in the master chamber, a damping piston provided in the second simulation chamber and configured to provide displacement changeable by the reaction force piston, a simulation passage configured to allow the first simulation chamber to communicate with the second simulation chamber, and a simulator valve provided in the simulation passage so as to control flow of the brake fluid. The damping piston may include a piston member configured to pressurize the second simulation chamber, and an elastic member disposed between the reaction force piston and the piston member.

The electronic brake system may further include a first backup passage configured to connect the master chamber to the first hydraulic circuit, a second backup passage configured to connect the first simulation chamber to the second hydraulic circuit, a first cut valve provided in the first backup passage so as to control flow of the brake fluid, and a second cut valve provided in the second backup passage so as to flow of the brake fluid.

In accordance with another aspect of the present disclosure, a method for operating the electronic brake system includes performing a normal operation mode. The normal operation mode may includes, as hydraulic pressure of the brake fluid flowing from the hydraulic-pressure supply device to the wheel cylinders gradually increases, performing a first braking mode configured to primarily provide hydraulic pressure, performing a second braking mode configured to secondarily provide hydraulic pressure, and performing a third braking mode configured to tertiarily provide hydraulic pressure.

The first braking mode may include closing the first dump valve to allow the hydraulic piston to move forward, such that hydraulic pressure produced in the first pressure chamber flows into the wheel cylinders after passing through the hydraulic control unit, and opening the second dump valve to allow the brake fluid to flow from the reservoir to the second pressure chamber through the second dump passage.

The second braking mode may include closing the second dump valve to allow the hydraulic piston to move backward, such that hydraulic pressure produced in the second pressure chamber flows into the wheel cylinders after passing through the hydraulic control unit.

The third braking mode may include closing the first dump valve and the second dump valve, moving the hydraulic piston forward such that some parts of the hydraulic pressure produced in the first pressure chamber flow into the wheel cylinders after passing through the hydraulic control unit, and allowing the remaining hydraulic-pressure parts other than the some parts of the hydraulic pressure produced in the first pressure chamber to flow into the second pressure chamber after passing through the hydraulic control unit.

The method may further include releasing the first braking mode. The releasing of the first braking mode may include closing the first dump valve to form negative pressure in the first pressure chamber by backward movement of the hydraulic piston such that the brake fluid provided to the wheel cylinders returns to the first pressure chamber after passing through the hydraulic control unit, and opening the second dump valve to allow the brake fluid stored in the second pressure chamber to be discharged to the reservoir through the second dump passage.

The method may further include releasing the second braking mode. The releasing of the second braking mode may include closing the second dump valve to form negative pressure in the second pressure chamber by forward movement of the hydraulic piston such that the brake fluid provided to the wheel cylinders returns to the second pressure chamber after passing through the hydraulic control unit, and opening the first dump valve to allow the brake fluid stored in the first pressure chamber to be discharged to the reservoir through the first dump passage.

The method may further include releasing the third braking mode. The releasing of the third braking mode may include closing the first dump valve to form negative pressure in the first pressure chamber by backward movement of the hydraulic piston such that the brake fluid provided to the wheel cylinders returns to the first pressure chamber after passing through the hydraulic control unit, and allowing at least some parts of the brake fluid stored in the second pressure chamber to flow into the first pressure chamber after passing through the hydraulic control unit.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
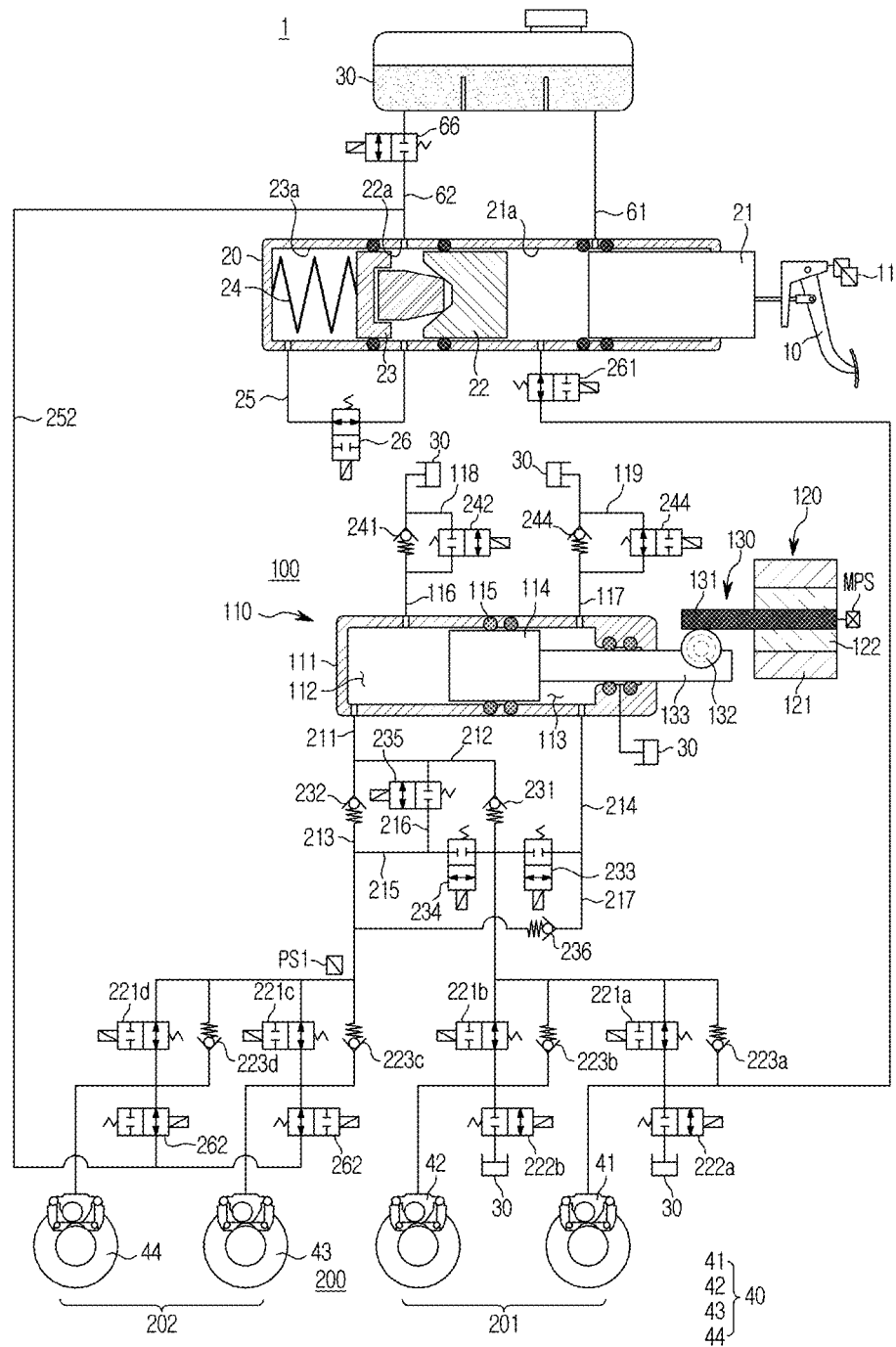
FIG. 1 is a hydraulic circuit diagram illustrating an electronic brake system according to a first embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

FIG. 1 is a hydraulic circuit diagram illustrating an electronic brake system 1 according to a first embodiment of the present disclosure.

Referring to FIG. 1, the electronic brake system 1 may include an integrated master cylinder 20 to pressurize and discharge a brake fluid (e.g., brake fluid) included therein according to a pedal effort of a brake pedal 10 depressed by a driver of a vehicle as well as to provide the driver with reaction force corresponding to a pedal effort of the brake pedal 10, a reservoir 30 formed to communicate with the master cylinder 20 to store the brake fluid, one or more wheel cylinders 40 to perform braking of respective wheels RR, RL, FR, and FL upon receiving hydraulic pressure generated by the brake fluid, a hydraulic-pressure supply device 100 to generate hydraulic pressure of a brake fluid by mechanically operating upon receiving an electrical signal indicating the driver's braking intention from a pedal displacement sensor 11 sensing displacement of the brake pedal 10, a hydraulic control unit to control hydraulic pressure applied to the wheel cylinders 40, and an electronic control unit (ECU) (not shown) to control the hydraulic-pressure supply device 100 and various valves based on hydraulic pressure information and pedal displacement information.

The integrated master cylinder 20 may be configured to have a master chamber 21a and simulation chambers 22a and 23a to pressurize and discharge the brake fluid provided therein, and provide the driver with reaction force corresponding to a pedal effort of the brake pedal 10.

Figure 2:
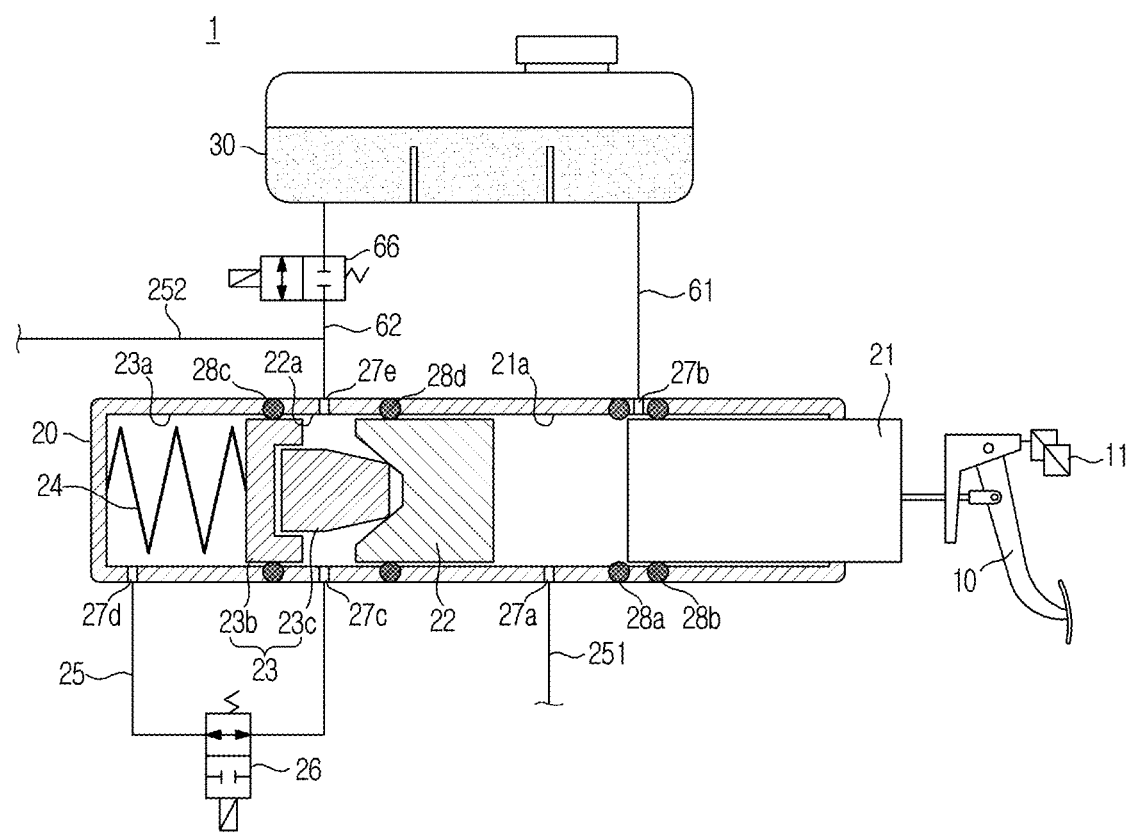
FIG. 2 is an enlarged view illustrating an integrated master cylinder, a reservoir, and reservoir passages for use in an electronic brake system according to a first embodiment of the present disclosure.

FIG. 2 is an enlarged view illustrating the integrated master cylinder 20, the reservoir 30, and reservoir passages 61 and 62 for use in the electronic brake system 1 according to a first embodiment of the present disclosure. Referring to FIG. 2, the integrated master cylinder 20 may include a master chamber 21a, a master piston 21 provided in the master chamber 21a to form displacement changeable by operation of the brake pedal 10, a restoring spring (not shown) to elastically support the master piston 21, first and second simulation chambers 22a and 23a, a reaction force piston 22 provided in the first simulation chamber 22a and movable by hydraulic pressure of a brake fluid stored in the master chamber 21a, a damping piston 23 provided in the second simulation chamber 23a and movable by displacement of the reaction force piston 22, a reaction force spring 24 provided in the second simulation chamber 23a to elastically support the reaction force piston 22 and the damping piston 23, a simulation passage 25 through which the first simulation chamber 22a communicates with the second simulation chamber 23a, and a simulator valve 26 provided in the simulation passage 25.

The master chamber 21a may include the master piston 21 connected to an input rod. The first simulation chamber 22a may include the reaction force piston 22. The second simulation chamber 23a may include the damping piston 23 and the reaction spring piston 29. The master chamber 21a, the first simulation chamber 22a, and the second simulation chamber 23a may be sequentially disposed in the integrated master cylinder 20 in the operation direction of the brake pedal.

The master chamber 21a may communicate with a first hydraulic port 27a and a second hydraulic port 27b through which a brake fluid (i.e., fluid) is input and output. The first simulation chamber 22a may communicate with a third hydraulic port 27c and a fifth second hydraulic port 27e through which a brake fluid (i.e., fluid) is input and output. The second simulation chamber 23a may communicate with a fourth hydraulic port 27d through which a brake fluid (i.e., fluid) is input and output. In more detail, the hydraulic port 20a may be connected to a first backup passage 251 to be described later, and the second hydraulic port 27b may be connected to a first reservoir passage 61 to be described later. The third hydraulic port 27c and the fourth hydraulic port 27d may be connected to the simulation passage 25, and the fifth hydraulic port 27e may be connected to a second backup passage 252 (to be described later) and the second reservoir passage 62.

Meanwhile, the integrated master cylinder 20 according to the first embodiment of the present disclosure may include the master chamber 21a and the first simulation chamber 22a, such that the integrated master cylinder 20 may secure safety in the event of malfunction. For example, the master chamber 21a may be connected to two wheels selected among from among a front right wheel FR, a front left wheel FL, a rear left wheel RL and a rear right wheel RR, and the first simulation chamber 22a may be connected to the remaining two wheels other than the selected wheels, such that braking of the vehicle remains possible even when one of the master chamber 21a and the first simulation chamber 22a malfunctions. For example, the master chamber 21a may be connected to first and second wheel cylinders 41 and 42, and the first simulation chamber 22a may be connected to third and fourth wheel cylinders 43 and 44.

A restoring spring (not shown) may be disposed between the master piston 21 and the reaction force piston 22 of the integrated master cylinder 20. The reaction force spring 24 may be disposed between the damping piston 23 and the end of the integrated master cylinder 20. The restoring spring may be compressed by the master piston that moves in response to change in displacement of the brake pedal 10 depressed by the driver. When the driver takes a foot off the brake pedal 10 to release the pedal effort applied to the brake pedal 10, the restoring spring may be expanded by elastic force, such that the master piston 21 can move back to an original position thereof.

The master chamber 21a may be connected to the reservoir 30 through the first reservoir passage 61, and the first simulation chamber 22a may be connected to the reservoir 30 through the second reservoir passage 62. The first reservoir passage 61 may be provided with a reservoir check valve (not shown) that allows a brake fluid to flow from the reservoir 30 to the master chamber 21a and prevents the brake fluid from flowing from the master chamber 21a to the reservoir 30. In another example, the master chamber 21a may use a sealing member 28a without using such a reservoir check valve, such that the master chamber 21a need not include the reservoir check valve therein and can also obtain the same results as in the reservoir check valve even when using the sealing member 28a.

The second reservoir passage 62 may be provided with a diagnostic valve 66 acting as a bidirectional control valve to control flow of a brake fluid received through the second reservoir passage 62. The diagnostic valve 66 may be implemented as a normally closed (NC) solenoid valve that remains closed in a normal state and is then open upon receiving an electrical signal from an electronic control unit (ECU). A second backup passage 252 may be branched from the front end of the diagnostic valve 66 on the second reservoir passage 62, and a detailed description thereof will be given.

Meanwhile, a plurality of reservoirs 30 may be shown in the drawings, and the respective reservoirs 30 may be denoted by the same reference number. However, the reservoirs 30 may be implemented as the same or different components.

The integrated master cylinder 20 may include two sealing members 28a and 28b respectively disposed before and after the first reservoir passage 61, and two other sealing members 28c and 28d respectively disposed before and after the second reservoir passage 62. Each of the four sealing members 28 may be formed in a ring shape that protrudes from the inner wall of the integrated master cylinder 20 or from the outer circumferences of the reaction force piston 22 and the damping piston 23. The sealing member 28a located forward of the first reservoir passage 61 connected to the master chamber 21a may be formed in a wedge shape or the like, such that the wedge-shaped sealing member 28a allows only unidirectional flow of the brake fluid from the reservoir 30 to the master chamber 21a, and prevents the brake fluid from flowing from the master chamber 21a to the reservoir 30.

The reaction force piston 22 may be installed to have a predetermined range of displacement within the first simulation chamber 22a by hydraulic pressure of the brake fluid pressurized by the master chamber 21a. The damping piston 23 may move along with the reaction force piston 22, such that the damping piston 23 can pressurize the brake fluid stored in the second simulation chamber 23a. The damping piston 23 may include a piston member 23b configured to pressurize the second simulation chamber 23a, and an elastic member 23c disposed between the reaction force piston 22 and the piston member 23b. In addition, a reaction force spring 24 may be disposed between the rear surface (e.g., a left surface of the damping piston 23 when viewed from FIGS. 1 and 2) of the damping piston 23 and the end of the integrated master cylinder 20, such that the damping piston 23 and the reaction force piston 23 can be elastically supported by the reaction force spring 24. The elastic member 23c may be disposed between the reaction force piston 22 and the piston member 23b, and may be formed of a material such as rubber that can be compressed or expanded by displacement of the reaction force piston 22 and the piston member 23b.

The simulation passage 25 may allow the first simulation chamber 22a and the second simulation chamber 23a to communicate with each other, and may be provided with the simulator valve 26 controlling flow of the brake fluid.

The simulator valve 26 may be implemented as a normally open (NO) solenoid valve that remains open in a normal state and is then closed upon receiving a closing signal from an electronic control unit (ECU).

A detailed description of the pedal simulation operation by the integrated master cylinder 20 is as follows. In a normal operation mode, when a pedal effort is applied to the brake pedal 10 depressed by the driver of the vehicle, a first cut valve 261 provided in the first backup passage 251 may be closed, the simulator valve 26 of the simulation passage 25 may also be closed, and the diagnostic valve 66 provided in the second reservoir passage 62 may be open. The simulator valve 26 is closed so that the second simulation chamber 23a is also closed, the master chamber 21 moves in response to displacement of the brake pedal so that the brake fluid stored in the master chamber 21a is pressurized, hydraulic pressure of the pressurized brake fluid is transmitted in a forward direction (i.e., a right side of the reaction force when viewed from FIGS. 1 and 2) of the reaction force piston 22, such that displacement may occur in the reaction force piston 22. Since the second simulation chamber 23a is sealed, there is no change in displacement of the piston member 23b. As a result, the elastic member 23c may be compressed by displacement of the reaction force piston 22, and elastic restoring force may occur by such compression of the elastic member 23c, resulting in formation of proper pedal feel for the driver. In this case, the brake fluid stored in the first simulation chamber 22a may be transmitted to the reservoir 30 through the second reservoir passage 62. Thereafter, when the driver takes a foot off the brake pedal 10 to release the pedal effort applied to the brake pedal 10, a restoring spring (not shown) and the elastic member 23c may be expanded by elastic force such that the reaction force piston 22 and the master piston 21 can move back to original positions thereof. The first simulation chamber 22a may receive the brake fluid through the second reservoir passage 62 so that the first simulation chamber 22a may be filled with the received brake fluid.

As described above, the first simulation chamber 22a may always be filled with the brake fluid. Therefore, frictional force of the reaction force piston 22 and the damping piston 23 are minimized during the pedal simulation operation, such that durability of the integrated master cylinder 20 can be improved and foreign materials from the outside can be prevented from flowing into the integrated master cylinder 20.

Meanwhile, when the electronic brake system 1 abnormally operates, i.e., when the electronic brake system 1 operates in a fallback mode, the integrated master cylinder 20 may operate as follows, and a detailed description thereof will hereinafter be given with reference to FIG. 10.

The hydraulic-pressure supply device 100 may mechanically operate by receiving an electrical signal indicating the driver's braking intention from a pedal displacement sensor 11 sensing displacement of the brake pedal 10, such that hydraulic pressure caused by the brake fluid may occur.

The hydraulic-pressure supply device 100 may include a hydraulic-pressure providing unit 110 to supply pressing-medium pressure to wheel cylinders 40, a motor 120 to produce rotational force according to an electrical signal from the pedal displacement sensor 11, and a power switching unit 130 to convert rotational motion of the motor 120 into rectilinear motion and to provide the rectilinear motion to the hydraulic-pressure providing unit 110. In this case, the hydraulic-pressure providing unit 110 may also operate by pressure supplied from a high-pressure accumulator, instead of using driving force supplied from the motor 120.

Figure 3:
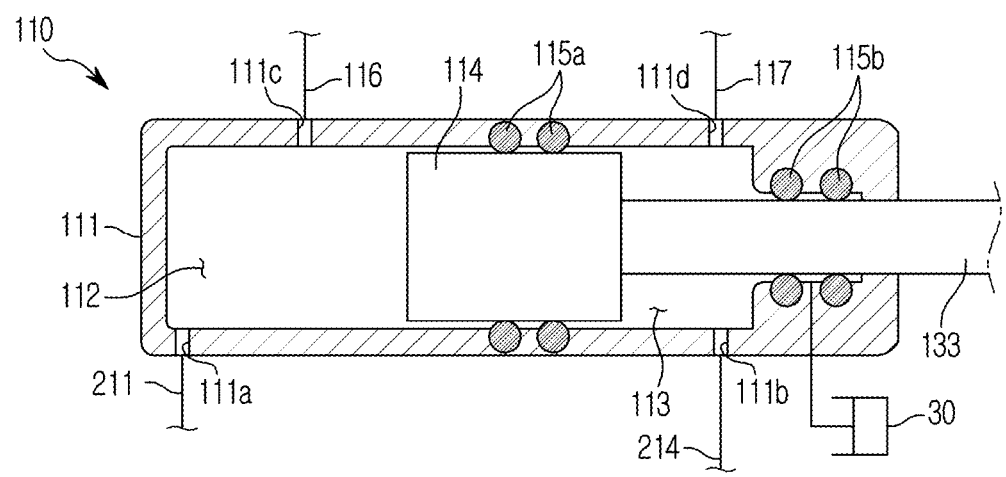
FIG. 3 is an enlarged view illustrating a hydraulic-pressure providing unit of an electronic brake system according to a first embodiment of the present disclosure.

FIG. 3 is an enlarged view illustrating a hydraulic-pressure providing unit 110 of the electronic brake system 1 according to the first embodiment of the present disclosure. Referring to FIG. 3, the hydraulic-pressure providing unit 110 may include a cylinder block 111, a hydraulic piston 114, sealing members 115a and 115b, and a drive shaft 133. The cylinder block 111 may have a pressure chamber to store a brake fluid supplied thereto. The hydraulic piston 114 may be provided in the cylinder block 111. The sealing members 115a and 115b may be disposed between the hydraulic piston 114 and the cylinder block 111 to seal the pressure chamber. The drive shaft 133 may transfer power from the power switching unit 130 to the hydraulic piston 114.

The pressure chamber may include a first pressure chamber 112 located at a front side (i.e., a forward direction, see a left side of the hydraulic piston when viewed from FIG. 3) of the hydraulic piston 114, and a second pressure chamber 113 located at a rear side (i.e., a backward direction, see a right side of the hydraulic piston in FIG. 3) of the hydraulic piston 114. That is, the first pressure chamber 112 may be divided by the cylinder block 111 and the front surface of the hydraulic piston 114, and may have a volume changeable according to movement of the hydraulic piston 114. The second pressure chamber 113 may be divided by the cylinder block 111 and the rear surface of the hydraulic piston 114, and may have a volume changeable according to movement of the hydraulic piston 114.

The first pressure chamber 112 may be connected to a first hydraulic passage 211 through a first communication hole 111a formed at the cylinder block 111. The second pressure chamber 113 may be connected to a fourth hydraulic passage 214 through a second communication hole 111b formed at the cylinder block 111.

The sealing member 115 may include a piston sealing member 115a and a drive-shaft sealing member 115b. The piston sealing member 115a may be disposed between the hydraulic piston 114 and the cylinder block 111 to seal a gap between the first pressure chamber 112 and the second pressure chamber 113. The drive-shaft sealing member 115b may be disposed between the drive shaft 133 and the cylinder block 111 to seal a gap between the second pressure chamber 113 and the opening of the cylinder block 111. Hydraulic pressure or negative pressure of the first and second pressure chambers 112 and 113 affected by forward or backward movement of the hydraulic piston 114 may be blocked by the piston sealing member 115a and the drive-shaft sealing member 115b, so that the resultant hydraulic pressure or negative pressure of the first and second pressure chambers 112 and 113 can be transmitted to the first and fourth hydraulic passages 211 and 214 without leaking to the second pressure chamber 113.

The first pressure chamber 112 may be connected to the reservoir 30 through a first dump passage 116 and a first bypass passage 118, and the second pressure chamber 113 may be connected to the reservoir 30 through a second dump passage 117 and a second bypass passage 119. The first pressure chamber 112 may receive brake fluid from the reservoir 30 through the first dump passage 116 and the first bypass passage 118, and may store the received brake fluid therein. The second pressure chamber 113 may receive brake fluid from the reservoir 30 through the second dump passage 117 and the second bypass passage 119, and may store the received brake fluid therein. Alternatively, through the first and second bypass passages, brake fluid stored in the first or second pressure chamber 112 or 113 may be transmitted to the reservoir 30. To this end, the first dump passage 116 may communicate with the first pressure chamber 112 through a third communication hole 111c formed in the cylinder block 111, and may be connected to the reservoir 30. The second dump passage 117 may communicate with the second pressure chamber 113 through a fourth communication hole 111d formed in the cylinder block 111, and may be connected to the reservoir 30. In addition, the first bypass passage 118 may be branched from the first dump passage 116 and then linked again to the first dump passage 116. The second bypass passage 119 may be branched from the second dump passage 117 and then linked again to the second dump passage 117.

The first and second dump passages 116 and 117 may respectively include first and second dump check valves 241 and 243 controlling flow of the brake fluid. Referring back to FIG. 1, the first dump check valve 241 allows the brake fluid to flow from the reservoir 30 to the first pressure chamber 112, and prevents the brake fluid from flowing from the first pressure chamber 112 to the reservoir 30. The second dump check valve 243 allows the brake fluid to flow from the reservoir 30 to the second pressure chamber 113, and prevents the brake fluid from flowing from the second pressure chamber 113 to the reservoir 30.

In addition, the first dump passage 116 may be provided with the first bypass passage 118 connected parallel to the first dump check valve 251. The first bypass passage 118 may be provided with the first dump valve 242 configured to control flow of the brake fluid flowing between the first pressure chamber 112 and the reservoir 30. In other words, the first bypass passage 118 may be provided as a detour (i.e., a bypass route) on the first dump passage 116 such that the bypass passage 118 is connected to the first dump passage 117 by bypassing front and rear ends of the first dump check valve 241. The first dump valve 242 may be implemented as a bidirectional control valve to control flow of the brake fluid flowing between the first pressure chamber 112 and the reservoir 30. The first dump valve 242 may be implemented as a normally closed (NC) solenoid valve that remains closed in a normal state and is then open upon receiving an electrical signal from the ECU.

The second dump passage 117 may be provided with the second bypass passage 119 connected parallel to the second dump check valve 243. The second bypass passage 119 may be provided with a second dump valve 244 configured to control flow of the brake fluid flowing between the second pressure chamber 113 and the reservoir 30. In more detail, the second bypass passage 119 may be provided as a detour (i.e., a bypass route) on the second dump passage 117 such that the second bypass passage 119 is connected to the second dump passage 117 by bypassing front and rear ends of the second dump check valve 243. The second dump valve 244 may be implemented as a bidirectional control valve to control flow of the brake fluid flowing between the second pressure chamber 113 and the reservoir 30. The second dump valve 244 may be implemented as a normally open (NO) solenoid valve that remains open in a normal state and is then closed upon receiving an electrical signal from the ECU.

The motor 120 may produce driving force according to an electrical signal from the ECU. The motor 120 may include a stator 121 and a rotor 122, and may rotate in a forward or backward direction using the stator 121 and the rotor 122, such that the motor 120 may produce power or force through which displacement of the hydraulic piston 114 occurs. A rotational angular speed and a rotation angle of the motor 120 may be precisely controlled by a motor control sensor (MPS). The motor 120 is well known to those skilled in the art, and as such a detailed description thereof will herein be omitted for convenience of description.

The power switching unit 130 may convert rotational force of the motor 120 into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the hydraulic piston 114, such that the hydraulic piston 114 may slidably move within the cylinder block 111.

In more detail, a signal sensed by the pedal displacement sensor 11 due to displacement of the brake pedal 10 may be transmitted to the ECU, and the ECU may operate the motor 120 in one direction so that the worm shaft 131 may also rotate in one direction. Rotational force of the worm shaft 131 may be transmitted to the drive shaft 133 through the worm wheel 132, and the hydraulic piston 114 connected to the drive shaft 133 moves forward, so that hydraulic pressure may occur in the first pressure chamber 112.

In contrast, when a pedal effort is removed from the brake pedal 10, the ECU may operate the motor 120 so that the worm shaft 131 may rotate in the opposite direction. Accordingly, the worm wheel 132 may also rotate in the opposite direction, and the hydraulic piston 114 connected to the drive shaft 133 moves backward, thereby generating negative pressure in the first pressure chamber 112.

Hydraulic pressure and negative pressure may also occur in other directions opposite to the above-mentioned directions as necessary. In other words, a signal sensed by the pedal displacement sensor 11 due to displacement of the brake pedal 10 may be transmitted to the ECU, and the ECU may operate the motor 120 in an opposite direction so that the worm shaft 131 may also rotate in the opposite direction. Rotational force of the worm shaft 131 may be transmitted to the drive shaft 133 through the worm wheel 132, and the hydraulic piston 114 connected to the drive shaft 133 moves backward, so that hydraulic pressure may occur in the second pressure chamber 113.

In contrast, when a pedal effort is removed from the brake pedal 10, the ECU may operate the motor 120 in one direction so that the worm shaft 131 may also rotate in one direction. Accordingly, the worm wheel 132 may also rotate in the opposite direction, and the hydraulic piston 114 connected to the drive shaft 133 moves forward, thereby generating negative pressure in the second pressure chamber 113.

As described above, according to a rotation direction of the worm shaft 131 affected by driving of the motor 120, hydraulic pressure may occur in the first pressure chamber 112 or negative pressure may occur in the second pressure chamber 113. Information as to whether to brake the vehicle using hydraulic pressure or information as to whether to release braking using negative pressure may be determined by controlling several valves. A detailed description thereof will hereinafter be given.

Although not shown in the drawings, the power switching unit 130 may also be formed of a ball-screw-nut assembly. For example, the power switching unit 130 may include a screw that is integrated with a rotational shaft of the motor 120 or rotates with the rotational shaft of the motor 120, and a ball nut that is screw-coupled to the screw in a restricted rotation state and performs rectilinear motion according to rotation of the screw. The above-mentioned ball-screw-nut assembly is well known to those skilled in the art, and as such a detailed description thereof will herein be omitted. In addition, the power switching unit 130 according to the first embodiment of the present disclosure may be implemented not only as the ball-screw-nut assembly, but also as any structure capable of converting rotational motion into rectilinear motion without departing from the scope and spirit of the present disclosure.

The hydraulic control unit 200 may be provided to control hydraulic pressure to be applied to the wheel cylinders 40, and the ECU may be provided to control the hydraulic-pressure supply device 100 and various valves based on hydraulic pressure information and pedal displacement information.

The hydraulic control unit 200 may include a first hydraulic circuit 201 to control flow of hydraulic pressure applied to first and second wheel cylinders 41 and 42, and a second hydraulic circuit 202 to control flow of hydraulic pressure applied to third and fourth cylinders 43 and 44. The hydraulic control unit 200 may further include the integrated master cylinder 20, and a plurality of flow passages and a plurality of valves to control hydraulic pressure flowing from the hydraulic-pressure supply device 100 to the wheel cylinders 40.

A detailed description of the hydraulic control unit 200 will hereinafter be given with reference to FIG. 1

Referring to FIG. 1, the first hydraulic passage 211 may be provided to connect the first pressure chamber 112 to the first and second hydraulic circuits 201 and 202. The first hydraulic passage 211 may be branched into a second hydraulic passage 212 communicating with the first hydraulic circuit 201 and a third hydraulic passage 213 communicating with the second hydraulic circuit 202. As a result, hydraulic pressure produced in the first pressure chamber 112 by forward movement of the hydraulic piston 114 may be transmitted to the first hydraulic circuit 201 and the second hydraulic circuit 202 through the second hydraulic passage 212 and the third hydraulic passage 213.

A first control valve 231 to control flow of a brake fluid may be provided in the second hydraulic passage 212. The first control valve 231 may be provided as a check valve that allows the brake fluid to flow from the first pressure chamber 112 to the first hydraulic circuit 201 and prevents the brake fluid from flowing from the first hydraulic circuit 201 to the first pressure chamber 112. That is, the first control valve 231 may allow hydraulic pressure produced in the first pressure chamber 112 to flow into the first hydraulic circuit 201, and may prevent hydraulic pressure produced in the first and second hydraulic circuits 201 and 202 from leaking to the first pressure chamber 112 through the second hydraulic passage 212.

A second control valve 232 to control flow of a brake fluid may be provided in the third hydraulic passage 212. The second control valve 232 may be provided as a check valve that allows the brake fluid to flow from the first pressure chamber 112 to the second hydraulic circuit 202 and prevents the brake fluid from flowing from the second hydraulic circuit 202 to the first pressure chamber 112. That is, the second control valve 232 may allow hydraulic pressure produced in the first pressure chamber 112 to flow into the second hydraulic circuit 202, and may prevent hydraulic pressure produced in the second hydraulic circuit 202 from leaking to the first pressure chamber 112 through the third hydraulic passage 213.

The fourth hydraulic passage 214 may be provided to interconnect the second pressure chamber 113 to the first hydraulic circuit 201. To this end, one end of the fourth hydraulic passage 214 may communicate with the second pressure chamber 113, and the other end of the fourth hydraulic passage 214 may communicate with the rear end of the first control valve 231 on the second hydraulic passage 212. One end of the fifth hydraulic passage 215 may be connected to the rear end of the first control valve 231 on the second hydraulic passage 212, and the other end of the fifth hydraulic passage 215 may be connected to the rear end of the second control valve 232 of the third hydraulic passage 213, such that the second hydraulic passage 212 may be connected to the third hydraulic passage 213. To this end, one end of the sixth hydraulic passage 216 may communicate with the front end of the first control valve 231 on the second hydraulic passage 212, and the other end of the sixth hydraulic passage 216 may communicate with the fifth hydraulic passage 215. In addition, the seventh hydraulic passage 217 may be branched from the front end of the third control valve 233 on the fourth hydraulic passage 214, and may be linked to the rear end of the second control valve 232 on the third hydraulic passage 213, such that the second pressure chamber 113 may be connected to the second hydraulic circuit 202 through the seventh hydraulic passage 217.

The fourth hydraulic passage 214 may be provided with the third control valve 233 to control flow of the brake fluid.

The third control valve 233 may be implemented as a bidirectional control valve to control flow of the brake fluid flowing along the fourth hydraulic passage 214 communicating the second pressure chamber 113. The third control valve 233 may be implemented as a normally closed (NC) solenoid valve that remains closed in a normal state and is then open upon receiving an electrical signal from the ECU.

The fifth hydraulic passage 215 may be provided with the fourth control valve 234 to control flow of the brake fluid.

The fourth control valve 234 may be disposed between a first position connected to the sixth hydraulic passage 216 on the fifth hydraulic passage 215 and a second position connected to the second hydraulic passage 212 on the fifth hydraulic passage 215. The fourth control valve 234 may be implemented as a bidirectional control valve to control flow of the brake fluid flowing along the fifth hydraulic passage 215. The fourth control valve 234 may be implemented as a normally closed (NC) solenoid valve that remains closed in a normal state and is then open upon receiving an electrical signal from the ECU.

The sixth hydraulic passage 216 may be provided with the fifth control valve 235 to control flow of the brake fluid.

The fifth control valve 235 may be implemented as a bidirectional control valve to control flow of the brake fluid flowing along the sixth hydraulic passage 216. The fifth control valve 235 may be implemented as a normally closed (NC) solenoid valve that remains closed in a normal state and is then open upon receiving an electrical signal from the ECU.

The seventh hydraulic passage 217 may be provided with a seventh valve 236 to control flow of the brake fluid.

The sixth control valve 236 may be provided as a check valve that allows the brake fluid to flow from the second pressure chamber 113 to the second hydraulic circuit 202 and prevents the brake fluid from flowing from the second hydraulic circuit 202 to the second pressure chamber 113. That is, the sixth control valve 236 may prevent hydraulic pressure of the second hydraulic circuit 202 from leaking to the second pressure chamber 113 through the seventh hydraulic passage 217, whereas the sixth control valve 236 may allow hydraulic pressure produced in the second pressure chamber 112 to flow into the second hydraulic circuit 202.

The first hydraulic circuit 201 and the second hydraulic circuit 202 of the hydraulic control unit 200 will hereinafter be described with reference to the attached drawings.

The first hydraulic circuit 201 may control hydraulic pressure of the first and second wheel cylinders 41 and 42 installed in two wheels selected from among four wheels RR, RL, FR, and FL, and may control hydraulic pressure of the third and fourth wheel cylinders 43 and 44 installed in the remaining two wheel cylinders other than the selected wheels.

The first hydraulic circuit 201 may receive hydraulic pressure from the hydraulic-pressure supply device 100 through the second hydraulic passage 212, and the second hydraulic passage 212 may be branched into two passages that are respectively connected to the first wheel cylinder 41 and the second wheel cylinder 42. Likewise, the second hydraulic circuit 202 may receive hydraulic pressure from the hydraulic-pressure supply device 100 through the third hydraulic passage 213, and the fourth hydraulic passage 214 may be branched into two passage that are respectively connected to the third wheel cylinder 43 and the fourth wheel cylinder 44.

The first and second hydraulic circuits 201 and 202 may include a plurality of inlet valves 221 (221a, 221b, 221c, 221d) to control flow of a brake fluid applied to the first to fourth wheel cylinders 40 and hydraulic pressure of the brake fluid. In more detail, the first hydraulic circuit 201 may include the inlet valves 221a and 221b, and the second hydraulic circuit 202 may include the inlet valves 221c and 221d. The first to fourth inlet valves 221 may be arranged upstream of the first to fourth wheel cylinders 41, 42, 43 and 44. The inlet valves 221 may be implemented as normally open (NO) solenoid valves that remain open in a normal state and are then closed upon receiving an electrical signal from the ECU.

The first and second hydraulic circuits 201 and 202 may include check valves 223a, 223b, 223c, and 223d connected in parallel to the first to fourth inlet valves 221a, 221b, 221c, and 221d. The check valves 223a, 223b, 223c, and 223d may be provided in bypass passages by which front ends and rear ends of the respective inlet valves 221a, 221b, 221c, and 221d are connected to one another in the first and second hydraulic circuits 201 and 202. The check valves 223a, 223b, 223c, and 223d may allow a brake fluid to flow from the wheel cylinders 40 to the hydraulic-pressure providing unit 110 and may prevent the brake fluid from flowing from the hydraulic-pressure providing unit 110 to the wheel cylinders 40. The first to fourth check valves 223a, 223b, 223c, and 223d may allow hydraulic pressure of the brake fluid applied to the first to fourth wheel cylinders 40 to be rapidly discharged. Alternatively, even when the inlet valves 221a, 221b, 221c, and 221d abnormally operate, the first to fourth check valves 223a, 223b, 223c, and 223d may allow hydraulic pressure of the brake fluid applied to the wheel cylinders 40 to flow into the hydraulic-pressure providing unit 110.

The first hydraulic circuit 201 may include first and second outlet valves 222a and 222b connected to the reservoir 30 so as to improve performance or throughput when braking of the first and second wheel cylinders 41 and 42 is released. The first and second outlet valves 222 may be respectively connected to the first and second wheel cylinders 41 and 42 so as to control flow of the brake fluid discharged from the wheel cylinders 41 and 42. That is, the first and second outlet valves 222 (222a and 222b) may sense brake pressures of the first and second wheel cylinders 41 and 42. If decompression braking is needed, the first and second outlet valves 222 (222a and 222b) may be selectively open to control decompression of the wheel cylinders 41 and 42. The first and second outlet valves 222 (222a and 222b) may be implemented as normally closed (NC) solenoid valves that remain closed in a normal state and are then open upon receiving an electrical signal from the ECU.

Meanwhile, a second backup passage 252 may be linked to rear ends or downstream sides of the third and fourth inlet valves 221c and 221d for the third and fourth wheel cylinders 43 and 44. The second backup passage 252 may be provided with at least one second cut valve 262 controlling flow of the brake fluid. A detailed description thereof will hereinafter be given.

The hydraulic-pressure providing unit 110 of the electronic brake system 1 according to the embodiment of the present disclosure may operate in a double-acting manner.

In more detail, hydraulic pressure produced in the first pressure chamber 112 by forward movement of the hydraulic piston 114 may be transmitted to the first hydraulic circuit 201 through the first and second hydraulic passages 211 and 212, thereby braking the first and second wheel cylinders 41 and 42. In addition, hydraulic pressure produced in the first pressure chamber 112 may be transmitted to the second hydraulic circuit 202 through the first hydraulic passage 211 and the third hydraulic passage 213, thereby braking the third and fourth wheel cylinders 43 and 44. In this case, hydraulic pressure produced in the first pressure chamber 112 may be transmitted to the second and third hydraulic passages 212 and 213 after sequentially passing through the first hydraulic passage 211, the sixth hydraulic passage 216, and the fifth hydraulic passage 215, such that the resultant hydraulic pressure may be transmitted to the first hydraulic circuit 201 and the second hydraulic circuit 202.

Likewise, hydraulic pressure produced in the second pressure chamber 113 by backward movement of the hydraulic piston 114 may be transmitted to the first hydraulic circuit 201 through the fourth hydraulic passage 214 and the second hydraulic passage 212, thereby braking the first and second wheel cylinders 41 and 42. In addition, hydraulic pressure produced in the second pressure chamber 113 by backward movement of the hydraulic piston 114 may also be transmitted to the second hydraulic circuit 202 through the seventh hydraulic passage 217 and the third hydraulic passage 213, thereby braking the third and fourth wheel cylinders 43 and 44. In this case, hydraulic pressure produced in the second pressure chamber 113 may be transmitted to the second hydraulic passage 212 after sequentially passing through the fourth hydraulic passage 214, the fifth hydraulic passage 215, and the sixth hydraulic passage 216, such that the resultant hydraulic pressure may be transmitted to the first hydraulic circuit 201.

Negative pressure produced in the first pressure chamber 112 by backward movement of the hydraulic piston 114 may suction the brake fluid from the first and second wheel cylinders 41 and 42, such that the brake fluid may move back from the first hydraulic circuit 201 to the first pressure chamber 112 through the second hydraulic passage 212, the fifth hydraulic passage 215, and the sixth hydraulic passage 216. In addition, the negative pressure produced in the first pressure chamber 112 by backward movement of the hydraulic piston 114 may suction the brake fluid from the third and fourth wheel cylinders 43 and 44, such that the brake fluid may move back from the second hydraulic circuit 202 to the first pressure chamber 112 through the third hydraulic passage 213, the fifth hydraulic passage 215, and the sixth hydraulic passage 216.

The electronic brake system 1 according to the first embodiment of the present disclosure may include a first backup passage 251 and a second backup passage 252, each of which is configured to directly transmit the brake fluid discharged from the integrated master cylinder 20 to the wheel cylinders during abnormal operation of the electronic brake system 1, resulting in braking of the vehicle. A mode in which hydraulic pressure from the integrated master cylinder 20 can be directly transmitted to the wheel cylinders is referred to as a fallback mode.

The first backup passage 251 may connect the master chamber 21a of the integrated master cylinder 20 to the first hydraulic circuit 201, and the second backup passage 252 may connect the simulation chamber 22a of the integrated master cylinder 20 to the second hydraulic circuit 202. In more detail, the first backup passage 251 may be linked to at least one of the rear end of the first inlet valve 221a and the rear end of the second inlet valve 221b in the first hydraulic circuit 201, and the second backup passage 252 may be linked to at least one of the rear end of the inlet valve 221c and the rear end of the fourth inlet valve 221d in the second hydraulic circuit. Although the drawings have disclosed that the second backup passage 252 is branched into two passages and one passage from among the two passages is connected to the rear end of the third inlet valve 221c and the other one of the two passages is connected to the rear end of the fourth inlet valve 221d for convenience of description and better understanding of the present disclosure, the scope or spirit of the present disclosure is not limited thereto, and it should be noted that those skilled in the art can readily understand other modifications so long as the second backup passage 252 can be linked to at least one of the rear end of the third inlet valve 221c and the fourth inlet valve 221d.

The first backup passage 251 may be provided with the first cut valve 261 controlling flow of the brake fluid, and the second backup passage 252 may be provided with at least one second cut valve 262 controlling flow of the brake fluid. If the second backup passage 252 is branched out at a branch point and is then linked to each of the rear end of the third inlet valve 221c and the rear end of the fourth inlet valve 221 at a link point, the number of second cut valves 262 to be used in the range from the branch point to the link point may be set to a plural number. The first and second cut valves 261 and 262 may be implemented as normally open (NO) solenoid valves that remain open in a normal state and are then closed upon receiving a closing signal from the ECU.

Therefore, hydraulic pressure received from the hydraulic-pressure supply device 100 when the first and second cut valves 261 and 262 are closed may be supplied to the wheel cylinders 40 through the first and second hydraulic circuits 201 and 202. Hydraulic pressure received from the integrated master cylinder 20 when the first and second cut valves 261 and 262 are open may be supplied to the wheel cylinders through the first and second backup passages 251 and 252.

The electronic brake system 1 according to the first embodiment of the present disclosure may include a passage pressure sensor PS1 to sense hydraulic pressure of at least one of the first hydraulic circuit 201 and the second hydraulic circuit 202. The passage pressure sensor PS1 may be provided at the front end of the inlet valve 221 of at least one of the first hydraulic circuit 201 and the second hydraulic circuit 202, thereby sensing hydraulic pressure applied to the first hydraulic circuit 201 and hydraulic pressure applied to the second hydraulic circuit 202. Although the drawings have disclosed that the passage pressure sensor PS1 is provided in the first hydraulic circuit 201 and the second hydraulic circuit 202 for convenience of description, the scope or spirit of the present disclosure is not limited thereto, and it should be noted that the number of passage pressure sensors may also be set to 1 or any other number so long as hydraulic pressure applied to each of the hydraulic circuits 201 and 202 can be sensed.

A method for operating the electronic brake system 1 configured to provide brake pressure in a normal operation mode according to the first embodiment of the present disclosure will hereinafter be described with reference to the attached drawings.

The electronic brake system 1 according to the first embodiment of the present disclosure may use the hydraulic-pressure supply device 100 in different ways according to a first braking mode, a second braking mode, and a third braking mode. In the first braking mode, hydraulic pressure produced by the hydraulic-pressure supply device 100 may be primarily provided to the wheel cylinders 40. In the second braking mode, hydraulic pressure produced by the hydraulic-pressure supply device 100 may be secondarily provided to the wheel cylinders 40, resulting in occurrence of higher brake pressure than the first braking mode. In the third braking mode, hydraulic pressure produced by the hydraulic-pressure supply device 100 may be further (i.e., tertiarily) provided to the wheel cylinders, resulting in occurrence of higher brake pressure than the second braking mode. The first to third braking modes may be changeable by operating the hydraulic-pressure supply device 100 and the hydraulic control unit 200 in different ways. The hydraulic-pressure supply device 100 may use the first to third braking modes, such that the hydraulic-pressure supply device 100 can provide higher hydraulic pressure without increasing an output level of the motor 120, resulting in reduction in unnecessary load applied to the motor 120. As a result, the production cost and weight of the brake system can be reduced and stable brake force can be obtained, resulting in an increase in durability and operational reliability of the brake system.

If the hydraulic piston 114 moves forward by driving of the motor 120, hydraulic pressure may occur in the first pressure chamber 112. As the hydraulic piston 114 gradually moves forward from an initial position thereof, (i.e., as an operation stroke of the hydraulic piston 114 gradually increases), the amount of a brake fluid flowing from the first pressure chamber 112 to the wheel cylinders 40 is gradually increased, such that a brake pressure is also increased.

However, there is an effective stroke in the hydraulic piston 114, such that a maximum pressure caused by forward movement of the hydraulic piston 114 may be present in the hydraulic piston 114. In contrast, if the hydraulic pressure 114 moves backward by driving of the motor 120, hydraulic pressure may also occur in the second pressure chamber 113. In this case, since the drive shaft 133 is present in the second pressure chamber 113, a pressure increate rate per stroke produced in the second pressure chamber 113 is less than that of the first pressure chamber 112.

Therefore, during an initial braking stage in which braking response characteristics are considered important, the electronic brake system 1 may control the hydraulic piston 114 to move forward to obtain a higher pressure increase rate per stroke. During the latter braking stage in which a maximum brake pressure is considered important, the hydraulic piston 114 first moves backward and then moves forward, resulting in occurrence of a higher maximum brake pressure in the latter braking stage.

Figure 4:
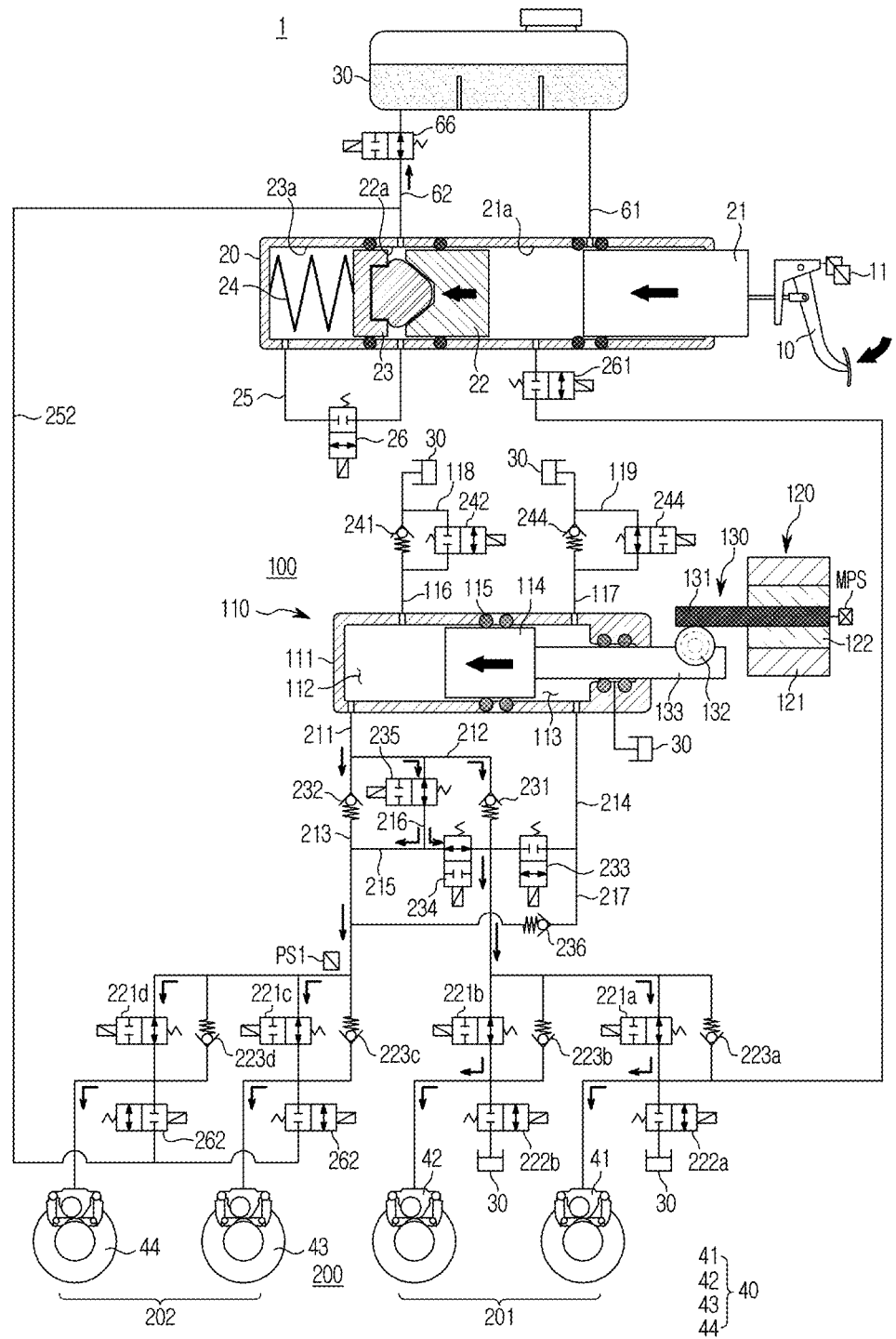
FIG. 4 is a hydraulic circuit diagram illustrating an electronic brake system for performing a first braking mode according to a first embodiment of the present disclosure.

FIG. 4 is a hydraulic circuit diagram illustrating a method for operating the electronic brake system 1 configured to perform the first braking mode by forward movement of the hydraulic piston 114 according to an embodiment of the present disclosure.

Referring to FIG. 4, when the driver depresses the brake pedal 10 in the initial braking stage, the motor 120 may rotate in one direction (e.g., first direction), rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided to four wheels through the first hydraulic circuit 201 and the second hydraulic circuit 202, such that braking force occurs in the wheel cylinders 40.

In more detail, hydraulic pressure produced in the first pressure chamber 112 may sequentially pass through the first hydraulic passage 211 and the second hydraulic passage 212, or may sequentially pass through the first hydraulic passage 211, the sixth hydraulic passage 216, the fifth hydraulic passage 215, and the second hydraulic passage 212, such that the resultant hydraulic pressure is primarily transmitted to the wheel cylinders 41 and 42 provided in the first hydraulic circuit 201. In this case, the first and second inlet valves 221a and 221b respectively installed in two passages branched from the first hydraulic circuit 201 may remain open, and the first and second outlet valves 222a and 222b installed in passages branched from two passages branched from the first hydraulic circuit 201 may remain closed, such that hydraulic pressure is prevented from leaking to the reservoir 30.

In addition, hydraulic pressure produced in the first pressure chamber 112 may sequentially pass through the first hydraulic passage 211 and the third hydraulic passage 213, or may sequentially pass through the first hydraulic passage 211, the sixth hydraulic passage 216, the fifth hydraulic passage 215, and the third hydraulic passage 213, such that the resultant hydraulic pressure is primarily transmitted to the wheel cylinders 43 and 44 provided in the second hydraulic circuit 201. In this case, the third and fourth inlet valves 221c and 221d respectively installed in two passages branched from the second hydraulic circuit 202 may remain open. In addition, as will be described later, the second cut valve 262 of the second backup passage 251 may also remain closed in a normal state so that hydraulic pressure received through the third and fourth inlet valves 221c and 221d is prevented from leaking to the second backup passage 252.

In order to implement the above-mentioned operations, in the first braking mode, the fourth and fifth control valves 234 and 235 may remain open and the third control valve 233 may remain closed, such that the fourth hydraulic passage 214 can be blocked. As a result, hydraulic pressure produced in the first pressure chamber 112 may be prevented from flowing into the second pressure chamber 113 through the fourth hydraulic passage 214, such that a pressure increase rate per stroke of the hydraulic piston 114 may be improved. Therefore, the electronic brake system 1 may obtain a rapid braking response in the initial braking stage.

If hydraulic pressure occurs in the brake fluid by the hydraulic-pressure supply device 100, the first and second cut valves 261 and 262 respectively provided in the first and second backup passages 251 and 252 may be closed, such that hydraulic pressure discharged from the integrated master cylinder 20 is prevented from flowing into the wheel cylinders 40. Hydraulic pressure produced in the master chamber 21a in response to a pedal effort applied to the brake pedal 10 may be transmitted to the reaction force piston 22. In this case, the simulator valve 26 provided in the simulation passage 25 may be closed, the second simulation chamber 23a may be sealed, and the diagnostic valve 66 provided in the first reservoir passage 61 may be open, such that the first simulation chamber 22a may communicate with the reservoir 30. Brake fluid pressurized by the master piston 21 in the master chamber 21a may be transmitted to the reaction force piston 22, such that the elastic member 23c of the reaction force piston 23 is compressed, the brake fluid stored in the first simulation chamber 22a is transmitted to the reservoir 30 through the first reservoir passage 61, reaction force corresponding to a pedal effort of the brake pedal 10 occurs by elastic restoring force of the compressed elastic member 23c, resulting in proper pedal feel for the driver.

Figure 5:
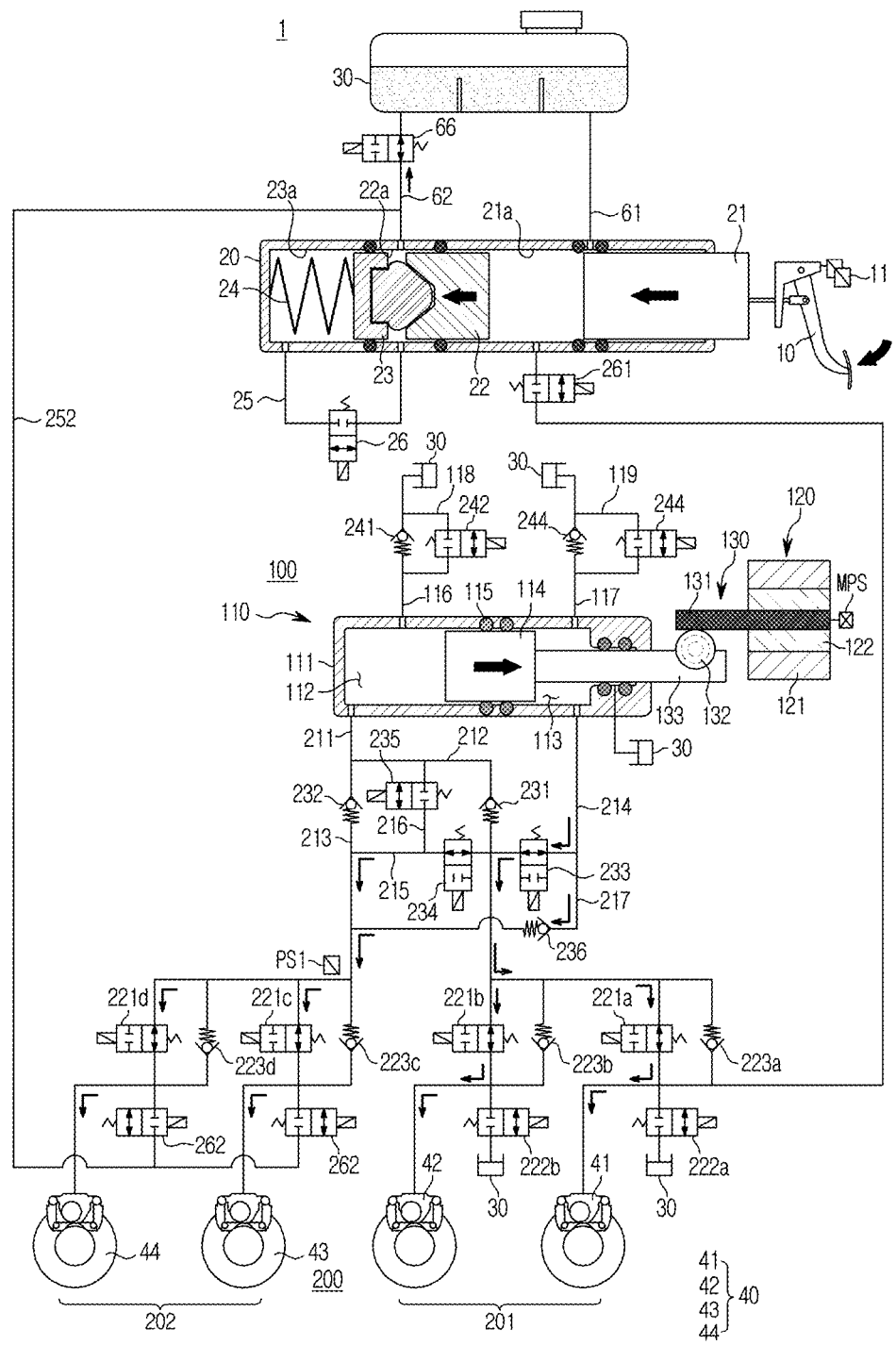
FIG. 5 is a hydraulic circuit diagram illustrating an electronic brake system for performing a second braking mode according to a first embodiment of the present disclosure.

In order to generate higher brake pressure than the first braking mode, the electronic brake system 1 according to the first embodiment of the present disclosure may switch from the first braking mode to the second braking mode shown in FIG. 5.

FIG. 5 is a hydraulic circuit diagram illustrating a method for operating the electronic brake system 1 configured to perform a second braking mode by backward movement of the hydraulic piston 114 according to the first embodiment of the present disclosure.

Referring to FIG. 5, when displacement of the brake pedal 10 sensed by the pedal displacement sensor 11 is higher than a first predetermined displacement level, or when hydraulic pressure sensed by the passage pressure sensor PS1 is higher than a first predetermined pressure level, the ECU may determine that higher brake pressure is required, so that the ECU may switch from the first braking mode to the second braking mode for higher brake pressure.

When the first braking mode transitions to the second braking mode, the motor 120 rotates in another direction (e.g., second direction), rotational force of the motor 120 is transmitted to the hydraulic-pressure providing unit 110 by the power switching unit 130, and the hydraulic piston 114 of the hydraulic-pressure providing unit 110 moves backward, such that hydraulic pressure may occur in the second pressure chamber 113. Hydraulic pressure discharged from the second pressure chamber 113 may be transmitted to the first to fourth wheel cylinders 40 respectively provided at four wheels through the first hydraulic circuit 201 and the second hydraulic circuit 202, resulting in occurrence of braking force.

In more detail, hydraulic pressure received from the second pressure chamber 113 may be secondarily transmitted to the wheel cylinders 41 and 42 provided in the first hydraulic circuit 201 after sequentially passing through the fourth hydraulic passage 214 and the second hydraulic passage 212. In this case, the first and second inlet valves 221a and 221b may remain open and the first and second outlet valves 222a and 222b of the first hydraulic circuit may remain closed, such that hydraulic pressure is prevented from leaking to the reservoir 30.

In addition, hydraulic pressure received from the second pressure chamber 113 may sequentially pass through the fourth hydraulic passage 214, the fifth hydraulic passage 215, and the third hydraulic passage 213, or may sequentially pass through the fourth hydraulic passage 214, the seventh hydraulic passage 217, and the third hydraulic passage 213, such that the resultant hydraulic pressure may be secondarily transmitted to the wheel cylinders 43 and 44 provided in the second hydraulic circuit 202. In this case, the third and fourth inlet valves 221c and 221d may remain open and the second cut valve 262 of the second backup passage 251 may remain closed, such that hydraulic pressure is prevented from leaking to the second backup passage 252.

In order to implement the above-mentioned operations, in the second braking mode, the third and fourth control valves 233 and 234 may remain open and the fifth control valve 235 may remain closed, such that the sixth hydraulic passage 216 can be blocked. As a result, hydraulic pressure produced in the second pressure chamber 113 may be prevented from flowing into the first pressure chamber 112 through the sixth hydraulic passage 214. In addition, the second dump valve 244 provided in the second bypass passage 119 may also transition to the closed state, such that hydraulic pressure produced in the second pressure chamber 113 is prevented from leaking to the reservoir 30 after passing through the second dump passage 117 and the second bypass passage 119.

In the same manner as in the first braking mode, in the second braking mode, the first and second cut valves 261 and 262 are closed, the simulator valve 26 is also closed, and the diagnostic valve 66 is open.

Figure 6:
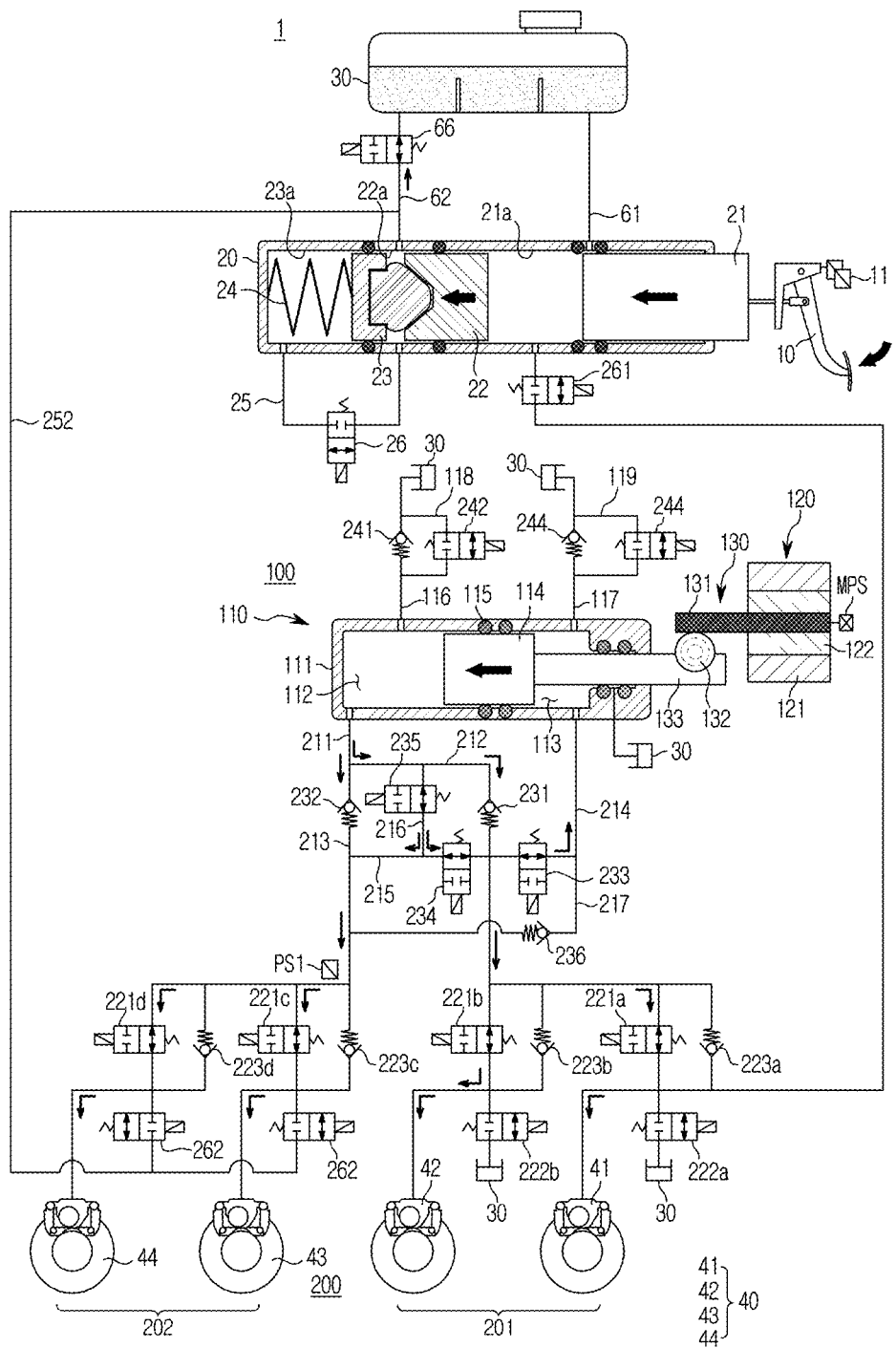
FIG. 6 is a hydraulic circuit diagram illustrating an electronic brake system for performing a third braking mode according to a first embodiment of the present disclosure.

In order to generate higher brake pressure than the second braking mode, the electronic brake system 1 according to the first embodiment of the present disclosure may transition to the third braking mode shown in FIG. 6.

FIG. 6 is a hydraulic circuit diagram illustrating a method for operating the electronic brake system 1 configured to perform a third braking mode by moving the hydraulic piston 14 forward again according to the first embodiment of the present disclosure.

Referring to FIG. 6, when displacement of the brake pedal 10 sensed by the pedal displacement sensor 11 is higher than a second predetermined displacement level, or when hydraulic pressure sensed by the passage pressure sensor PS1 is higher than a second predetermined pressure level, the ECU may determine that higher brake pressure is required, so that the ECU may switch from the second braking mode to the third braking mode for higher brake pressure.

When the second braking mode transitions to the third braking mode, the motor 120 rotates again in the one direction (e.g., first direction), rotational force of the motor 120 is transmitted to the hydraulic-pressure providing unit 110 by the power switching unit 130, and the hydraulic piston 114 of the hydraulic-pressure providing unit 110 moves forward, such that hydraulic pressure may occur again in the first pressure chamber 112. Hydraulic pressure discharged from the first pressure chamber 112 may be transmitted to the first to fourth wheel cylinders 40 respectively provided at four wheels through the first hydraulic circuit 201 and the second hydraulic circuit 202, resulting in occurrence of braking force.

In more detail, hydraulic pressure received from the first pressure chamber 112 may sequentially pass through the first hydraulic passage 211 and the second hydraulic passage 212, or may sequentially pass through the fifth hydraulic passage 211, the sixth hydraulic passage 216, the fifth hydraulic passage 215, and the second hydraulic passage 212, such that the resultant hydraulic pressure may be tertiarily transmitted to the wheel cylinders 41 and 42 provided in the first hydraulic circuit 201. In this case, the first and second inlet valves 221a and 221b may remain open and the first and second outlet valves 222a and 222b of the first hydraulic circuit 201 may remain closed, such that hydraulic pressure is prevented from leaking to the reservoir 30.

In addition, hydraulic pressure received from the first pressure chamber 112 may sequentially pass through the first hydraulic passage 211 and the third hydraulic passage 213, or may sequentially pass through the first hydraulic passage 211, the sixth hydraulic passage 216, the fifth hydraulic passage 215, and the third hydraulic passage 213, such that the resultant hydraulic pressure may be tertiarily transmitted to the wheel cylinders 43 and 44 provided in the second hydraulic circuit 202. In this case, the third and fourth inlet valves 221c and 221d may remain open and the second cut valve 262 of the second backup passage 251 may remain closed, such that hydraulic pressure is prevented from leaking to the second backup passage 252.

In the third braking mode, the third control valve 233 may transition to the open state, so that the fourth hydraulic passage 214 may be open. Therefore, the first pressure chamber 112 may communicate with the second pressure chamber 113 in a manner that brake pressure of the first pressure chamber 112 is equal to brake pressure of the second pressure chamber 113 through synchronization, resulting in reduction in load applied to the motor 120. In more detail, the third braking mode is an operation mode for producing much higher brake pressure. Thus, in the third braking mode, as the hydraulic piston 114 moves farther forward, hydraulic pressure of the first pressure chamber 112 is increased, force needed for backward movement of the hydraulic piston 114 affected by the increased hydraulic pressure of the first pressure chamber 112 becomes stronger, such that load applied to the motor 120 is also increased. However, the fourth hydraulic circuit 214 is open under control of the third control valve 233, such that brake pressure of the first pressure chamber 112 is synchronized with brake pressure of the second pressure chamber 113, resulting in reduction of load applied to the motor 120.

In order to implement the above-mentioned operations, in the third braking mode, the third to fifth control valves 233, 234, and 235 may remain open and the fifth dump valve 241 and the second dump valve 242 may remain closed. The first dump valve 241 may be closed so that the brake fluid is prevented from flowing through the first dump passage 116. As a result, hydraulic pressure produced in the first pressure chamber 112 is prevented from leaking to the reservoir 30 by forward movement of the hydraulic piston 114. In addition, the second dump valve 242 is closed such that negative pressure may stably occur in the second pressure chamber 113 by forward movement of the hydraulic piston 114, and some parts of hydraulic pressure produced in the first pressure chamber 112 can be rapidly provided to the second pressure chamber 113. The second dump valve 244 provided in the second bypass passage 119 may remain closed, such that hydraulic pressure produced in the second pressure chamber 113 is prevented from leaking to the reservoir 30 after passing through the second dump passage 117 and the second bypass passage 119.

In the same manner as in the first and second braking modes, in the third braking mode, the first and second cut valves 261 and 262 are closed, the simulator valve 26 is also closed, and the diagnostic valve 66 is open.

A method for releasing brake pressure of the electronic brake system 1 in a normal operation mode according to the first embodiment of the present disclosure will hereinafter be described with reference to FIG. 6.

Figure 7:
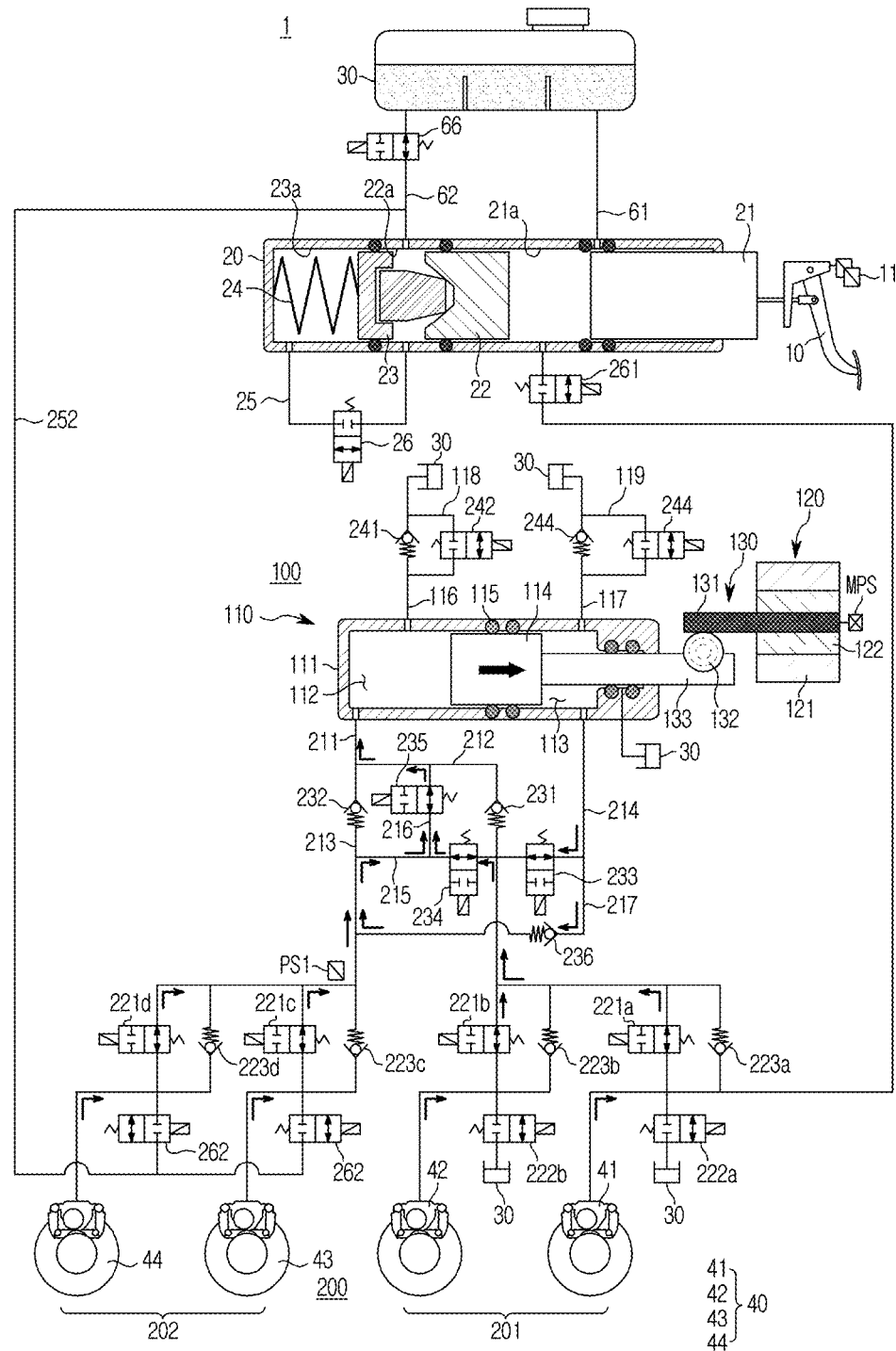
FIG. 7 is a hydraulic circuit diagram illustrating an electronic brake system for releasing a third braking mode according to a first embodiment of the present disclosure.

FIG. 7 is a hydraulic circuit diagram illustrating a method for operating the electronic brake system 1 configured to release the third braking mode by backward movement of the hydraulic piston 114 according to the first embodiment of the present disclosure.

Referring to FIG. 7, when a pedal effort applied to the brake pedal 10 is released (removed), the motor 120 rotates in another direction such that rotational force is transmitted from the motor 120 to the power switching unit 130, and the hydraulic piston 114 moves backward by a worm shaft 131, a worm wheel 132, and a drive shaft 133 of the power switching unit 130. Accordingly, hydraulic pressure of the first pressure chamber 112 is released (removed) and negative pressure occurs, and at the same time the brake fluid discharged from the wheel cylinders may be transmitted to the first pressure chamber 112 through the first and second hydraulic circuits 201 and 202.

In more detail, negative pressure produced in the first pressure chamber 112 may sequentially pass through the fifth hydraulic passage 215 and the sixth hydraulic passage 216, such that pressure of the first and second wheel cylinders 41 and 42 provided in the first hydraulic circuit 201 can be released (removed). In this case, the first and second inlet valves 221a and 221b respectively installed in two passages branched from the first hydraulic circuit 201 may remain open, and the first and second outlet valves 222a and 222b installed in passages that are respectively branched from the two passages branched from the first hydraulic circuit 201 may remain closed, such that hydraulic pressure of the brake fluid stored in the reservoir 30 is prevented from leaking to the first pressure chamber 112.

In addition, negative pressure produced in the first pressure chamber 112 may sequentially pass through the fifth hydraulic passage 215 and the sixth hydraulic passage 216, such that pressure of the third and fourth wheel cylinders 43 and 44 provided in the second hydraulic circuit 202 can be released (removed). In this case, the third and fourth inlet valves 221c and 221d respectively installed in two passages branched from the second hydraulic circuit 202 may remain open, and the second cut valve 262 of the second backup passage 215 may remain closed, such that hydraulic pressure of the brake fluid stored in the second backup passage 252 is prevented from leaking to the first pressure chamber 112.

In order to implement the above-mentioned operations, when the third braking mode is released, the third to fifth control valves 233, 234, and 235 may remain open, and the first pressure chamber 112 may communicate with the second pressure chamber 113. That is, in order to generate negative pressure in the first pressure chamber 112, the hydraulic piston 114 should move backward. However, when hydraulic pressure of the brake fluid is present in the second pressure chamber 113, unexpected resistance may occur in backward movement of the hydraulic piston 114. Therefore, the third control valve 233 may transition to the open state in a manner that the first pressure chamber 112 may communicate with the second pressure chamber 113 and brake pressure of the first pressure chamber 112 is synchronized with brake pressure of the second pressure chamber 113, so that the hydraulic piston 114 can easily move backward.

In this case, the second dump valve 244 may transition to the closed state. Since the second dump valve 244 is closed, the brake fluid stored in the second pressure chamber 113 is discharged only to the fourth hydraulic passage 214, such that the brake fluid stored in the second pressure chamber 113 can be supplied to the first pressure chamber 112. However, the second dump valve 244 may remain open as necessary, such that the brake fluid stored in the second pressure chamber 113 may also flow into the reservoir 30.

In addition, when negative pressure applied to each of the first and second hydraulic circuits 201 and 202 is measured to be higher than a target pressure release value corresponding to a released pedal effort of the brake pedal 10, at least one of the first and second outlet valves 222a and 222b is open, such that the resultant pressure may be controlled to correspond to the target pressure value.

Meanwhile, when the electronic brake system 1 is in a released state of the third braking mode as shown in FIG. 7, not only the brake fluid stored in the wheel cylinders 40 but also the brake fluid stored in the second pressure chamber 113 may be supplied to the first pressure chamber 112 due to occurrence of negative pressure in the first pressure chamber 112 affected by backward movement of the hydraulic piston 114, such that a pressure reduction rate of the wheel cylinders 40 is at a low level. Therefore, it may be difficult to rapidly release brake pressure in the third braking mode in which relatively high brake pressure is used. As a result, the operation for releasing brake pressure of the third braking mode may be used only in a high-pressure situation of the brake pressure. In order to rapidly release brake pressure that is equal to or less than a predetermined brake pressure, the electronic brake system 1 may transition to a mode (see FIG. 8) for releasing the second braking mode and/or a mode (see FIG. 9) for releasing the first braking mode, and a detailed description thereof will hereinafter be given with reference to FIGS. 8 and 9.

Figure 8:
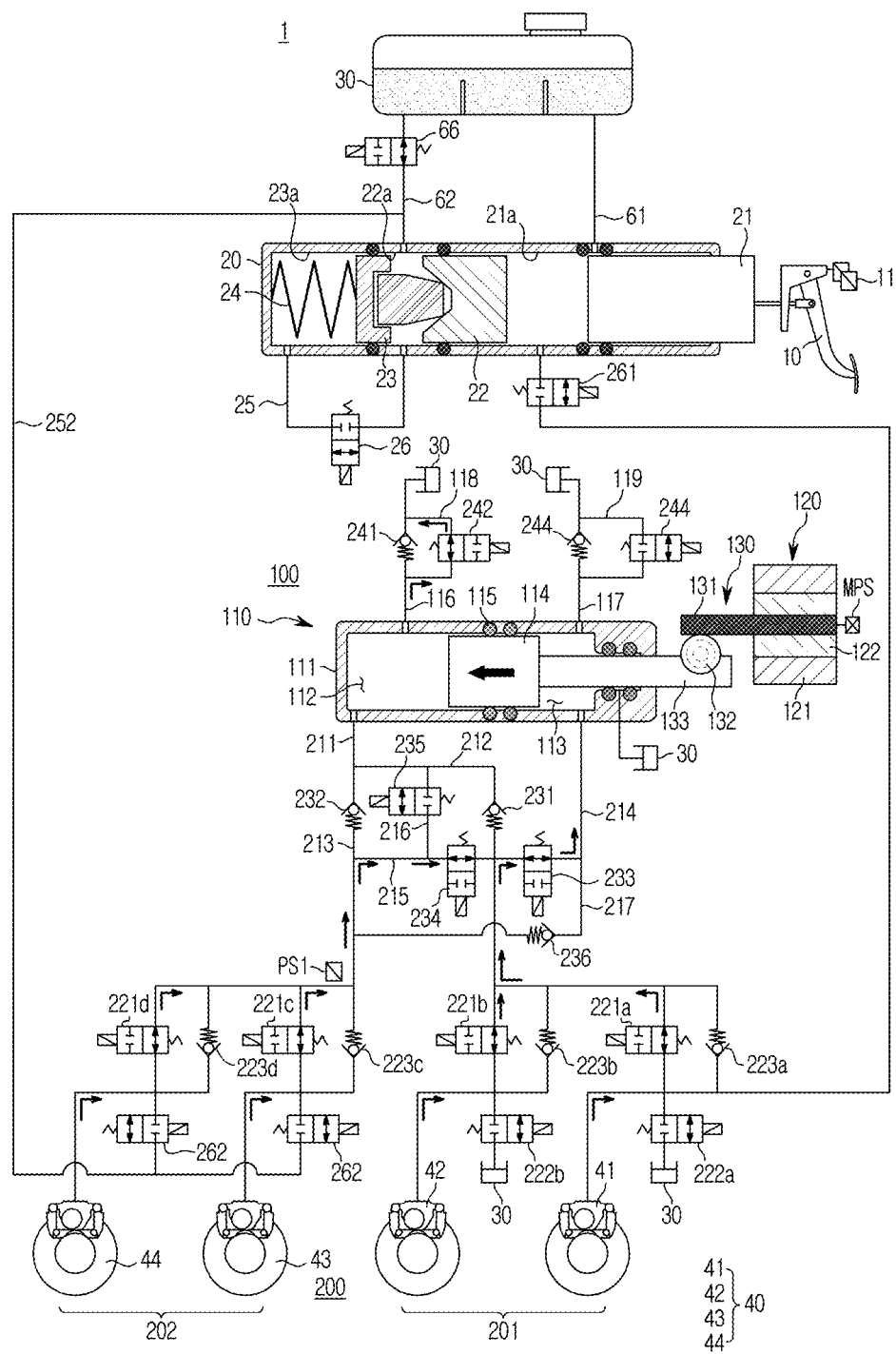
FIG. 8 is a hydraulic circuit diagram illustrating an electronic brake system for releasing a second braking mode according to a first embodiment of the present disclosure.

FIG. 8 is a hydraulic circuit diagram illustrating a method for operating the electronic brake system 1 configured to release the second braking mode by forward movement of the hydraulic piston 114 according to the first embodiment of the present disclosure.

Referring to FIG. 8, if there is a need to release the second braking mode, the motor 120 rotates in one direction to transmit rotational force to the power switching unit 130, and the hydraulic piston 114 moves forward by a worm shaft 131, a worm wheel 132, and a drive shaft 133 of the power switching unit 130. Thus, negative pressure may occur in the second pressure chamber 113. As a result, the brake fluid discharged from the wheel cylinders may be transmitted to the second pressure chamber 113 through the first and second hydraulic circuits 201 and 202.

In more detail, negative pressure produced in the second pressure chamber 113 may sequentially pass through the second hydraulic passage 212 and the fourth hydraulic passage 214, such that pressure of the first and second wheel cylinders 41 and 42 provided in the first hydraulic circuit 201 is released. In this case, the first and second inlet valves 221a and 221b respectively installed in two passages branched from the first hydraulic circuit 201 may remain open, and the first and second outlet valves 222a and 222b installed in passages that are respectively branched from the two passages branched from the first hydraulic circuit 201 may remain closed, such that hydraulic pressure of the brake fluid stored in the reservoir 30 is prevented from leaking to the second pressure chamber 113.

In addition, negative pressure produced in the first pressure chamber 112 may sequentially pass through the third hydraulic passage 213, the fifth hydraulic passage 215, and the fourth hydraulic passage 214, such that pressure of the third and fourth wheel cylinders 43 and 44 provided in the second hydraulic circuit 202 can be released. In this case, the third and fourth inlet valves 221c and 221d respectively installed in two passages branched from the second hydraulic circuit 202 may remain open, and the second cut valve 262 of the second backup passage 215 may remain closed, such that hydraulic pressure of the brake fluid stored in the second backup passage 252 is prevented from leaking to the second pressure chamber 113.

In order to implement the above-mentioned operations, when the second braking mode is released, the third and fourth control valves 233 and 234 may remain open and the fifth control valve 235 may transition to the closed state. That is, by forward movement of the hydraulic piston 114, negative pressure occurs in the second pressure chamber 113 and at the same time hydraulic pressure occurs in the first pressure chamber 112. Accordingly, even when hydraulic pressure of the first pressure chamber 112 is retransmitted to the second pressure chamber 113, brake pressure of the wheel cylinders 40 is not released, and the fifth control valve 235 transitions to the closed state, such that only the brake fluid stored in the wheel cylinders 40 can be transmitted to the second pressure chamber 113.

In this case, the first dump valve 242 may transition to the open state, such that hydraulic pressure produced in the first pressure chamber 112 is transmitted to the reservoir 30 through the first bypass passage 118 and at the same time the hydraulic piston 114 can easily move forward. In addition, the second dump valve 244 may remain closed such that negative can stably occur in the second pressure chamber 113.

In addition, when negative pressure applied to each of the first and second hydraulic circuits 201 and 202 is measured to be higher than a target pressure release value corresponding to a released pedal effort of the brake pedal 10, at least one of the first and second outlet valves 222a and 222b is open, such that the resultant pressure may be controlled to correspond to the target pressure value.

In order to completely release brake pressure of the wheel cylinders 40 after releasing the second braking mode (see FIG. 8), the electronic brake system 1 may transition to an operation mode (see FIG. 9) for releasing the first braking mode.

Figure 9:
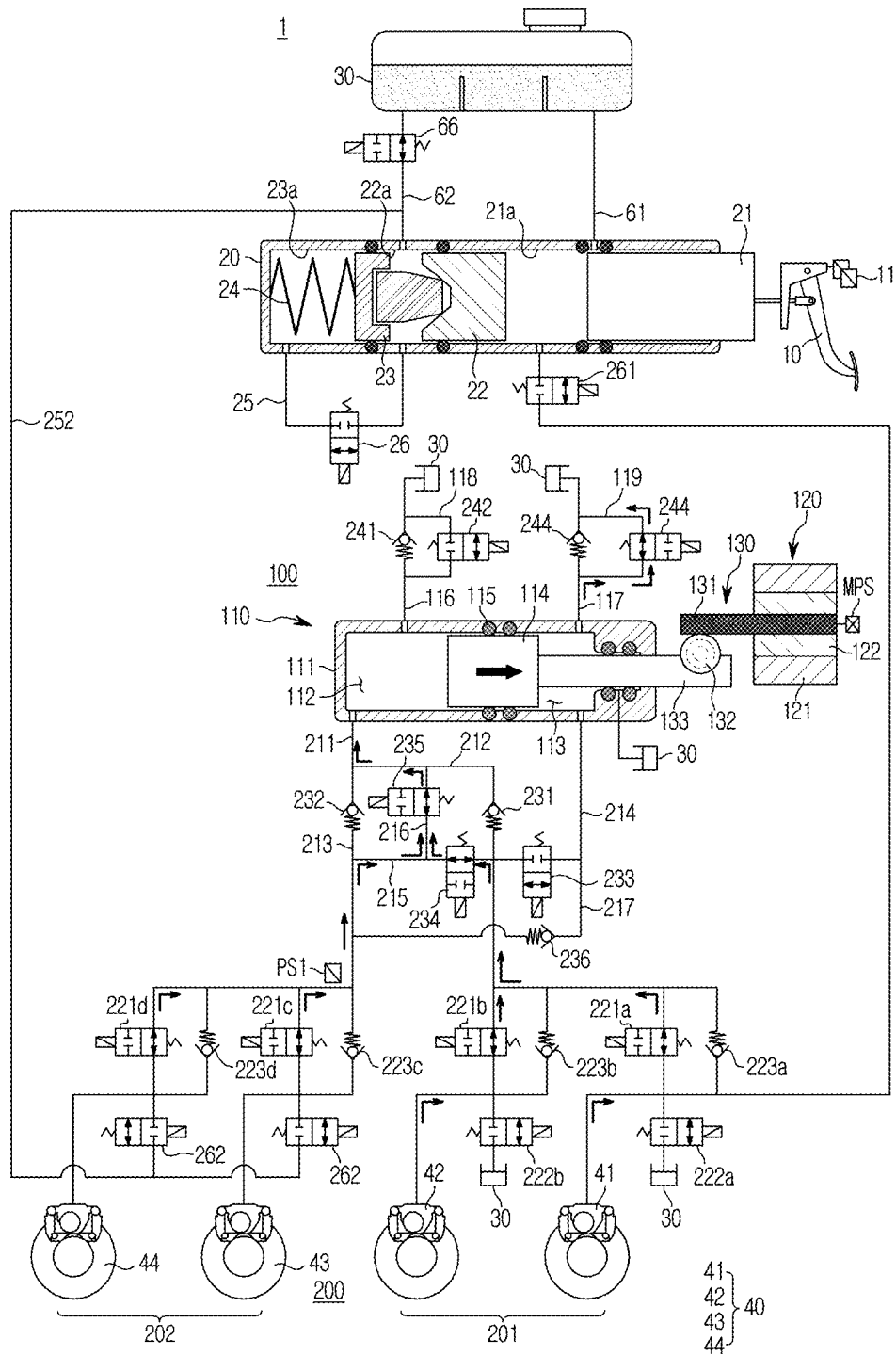
FIG. 9 is a hydraulic circuit diagram illustrating an electronic brake system for releasing a first braking mode according to a first embodiment of the present disclosure.

FIG. 9 is a hydraulic circuit diagram illustrating a method for operating the electronic brake system 1 configured to release the first braking mode by moving the hydraulic piston 114 backward again according to the first embodiment of the present disclosure.

Referring to FIG. 9, if there is a need to release the first braking mode, the motor 120 rotates again in the other direction to transmit rotational force to the power switching unit 130, and the hydraulic piston 114 moves backward by a worm shaft 131, a worm wheel 132, and a drive shaft 133 of the power switching unit 130. Thus, negative pressure may occur in the first pressure chamber 112. As a result, the brake fluid discharged from the wheel cylinders may be transmitted to the first pressure chamber 112 through the first and second hydraulic circuits 201 and 202.

In more detail, negative pressure produced in the first pressure chamber 112 may sequentially pass through the second hydraulic passage 212, the fifth hydraulic passage 215, and the sixth hydraulic passage 216, such that pressure of the first and second wheel cylinders 41 and 42 provided in the first hydraulic circuit 201 is released. In this case, the first and second inlet valves 221a and 221b respectively installed in two passages branched from the first hydraulic circuit 201 may remain open, and the first and second outlet valves 222a and 222b installed in passages that are respectively branched from the two passages branched from the first hydraulic circuit 201 may remain closed, such that hydraulic pressure of the brake fluid stored in the reservoir 30 is prevented from flowing into the first pressure chamber 112.

In addition, negative pressure produced in the first pressure chamber 112 may sequentially pass through the third hydraulic passage 213, the fifth hydraulic passage 215, and the sixth hydraulic passage 216, such that pressure of the third and fourth wheel cylinders 41 and 42 provided in the second hydraulic circuit 202 is released. In this case, the third and fourth inlet valves 221c and 221d respectively installed in two passages branched from the second hydraulic circuit 202 may remain open, and the second cut valve 262 of the second backup passage 215 may remain closed, such that hydraulic pressure of the brake fluid stored in the reservoir 30 is prevented from flowing into the first pressure chamber 112.

In order to implement the above-mentioned operations, when the first braking mode is released, the fourth and fifth control valves 234 and 235 may remain open and the third control valve 233 may transition to the closed state. That is, by backward movement of the hydraulic piston 114, negative pressure occurs in the first pressure chamber 112 and at the same time hydraulic pressure occurs in the second pressure chamber 113. Accordingly, even when hydraulic pressure of the second pressure chamber 113 is retransmitted to the first pressure chamber 113, brake pressure of the wheel cylinders 40 is not released, and the third control valve 233 transitions to the closed state, such that only the brake fluid stored in the wheel cylinders 40 can be transmitted to the first pressure chamber 112.

In this case, the second dump valve 242 may transition to the open state, such that hydraulic pressure produced in the second hydraulic chamber 113 is transmitted to the reservoir through the second bypass passage 119, and at the same time the hydraulic piston 114 can easily move backward. The first dump valve 242 may transition to the closed state, such that negative pressure can stably occur in the first pressure chamber 112.

A method for operating the electronic brake system 1 in an abnormal operation mode (i.e., a fallback mode) according to the first embodiment of the present disclosure will hereinafter be described with reference to FIG. 9.

Figure 10:
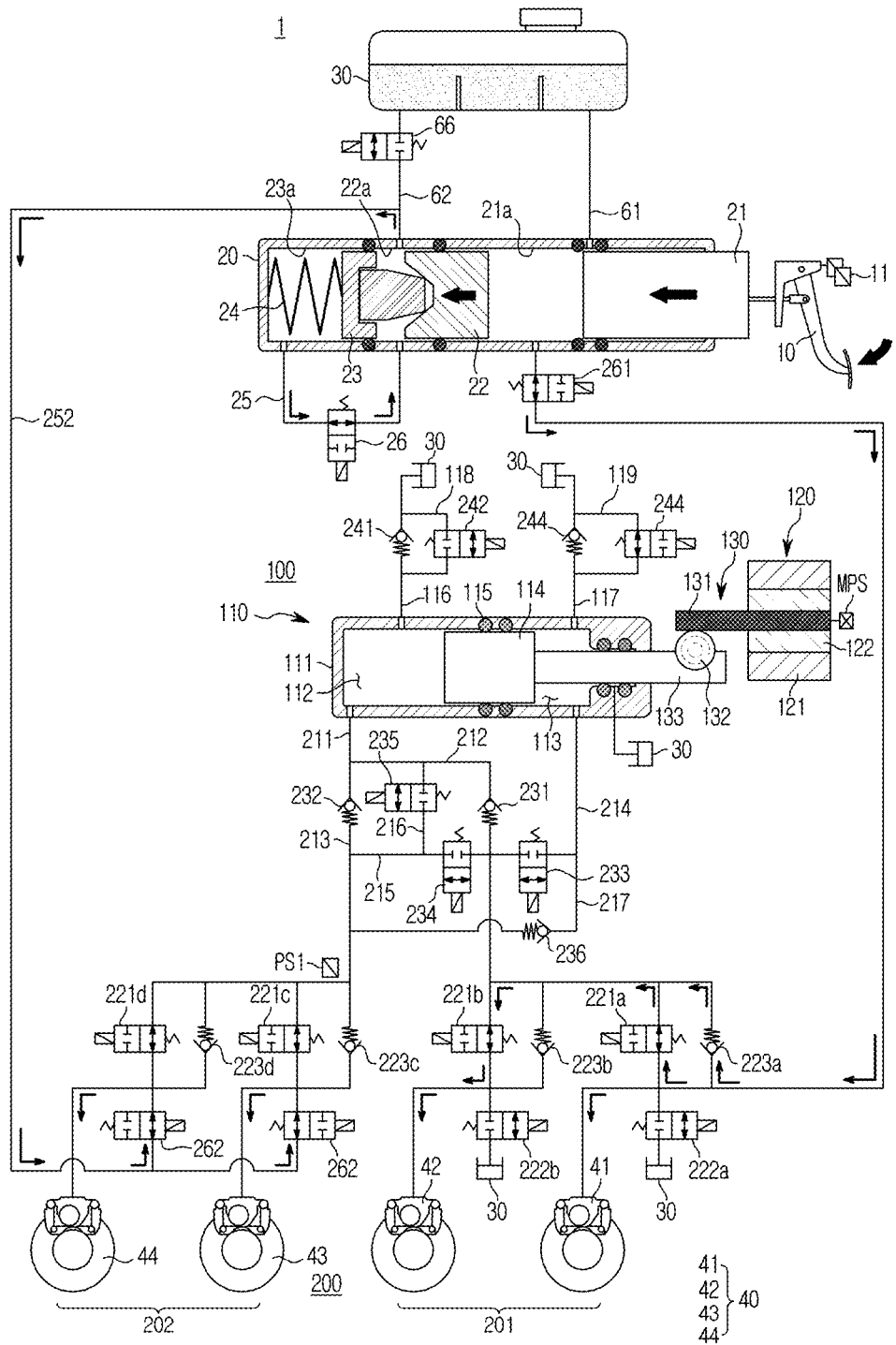
FIG. 10 is a hydraulic circuit diagram illustrating an electronic brake system for performing an abnormal operation mode (fallback mode) according to a first embodiment of the present disclosure.

FIG. 10 is a hydraulic circuit diagram illustrating a method for operating the electronic brake system 1 in an abnormal operation mode (i.e., a fallback mode) according to the first embodiment of the present disclosure.

Referring to FIG. 10, the fallback mode may be enabled or activated when it is impossible for the electronic brake system 1 to normally operate. In the fallback mode, the electronic brake system 1 may be controlled in a manner that respective valves thereof are controlled to return to the initial braking stage in which the valves do not operate (i.e., a non-operation state). Thereafter, once the driver depresses the brake pedal 10, the master piston 21 connected to the brake pedal 10 moves forward, such that brake fluid stored in the master chamber 21a by forward movement of the master piston 21 is pressurized. The brake fluid pressurized in the master chamber 21a may be transmitted to the first and second wheel cylinders 41 and 42 along the first backup passage 251, resulting in braking of the vehicle.

In addition, the brake fluid pressurized in the master chamber 21a may allow the reaction force piston 22 to move forward, such that the damping piston 23 moves forward by forward movement of the reaction force piston 22, the brake fluid stored in the second simulation chamber 23a flows into the first simulation chamber 22a through the simulation passage 25, and the brake fluid stored in the first simulation chamber 22a is transmitted to the third and fourth wheel cylinders 43 and 44 through the second reservoir passage 62 and the second backup passage 252, resulting in braking of the vehicle.

In a non-operation state, i.e., in a normal state in which the electronic brake system does not receive signals from the ECU, the first and second cut valves 261 and 262 respectively provided in the first and second backup passages 251 and 252 may remain open, the first to fourth inlet valves 221 provided in the first and second hydraulic circuits 201 and 202 may remain open, and the diagnostic valve 66 of the second reservoir passage 62 may remain closed. As a result, hydraulic pressure produced in the master chamber 21a and the first simulation chamber 22a of the integrated master cylinder 20 can be immediately transmitted to the four wheel cylinders 40, such that braking stability is improved and rapid braking is carried out.

An electronic brake system 2 according to a second embodiment of the present disclosure will hereinafter be described with reference to FIG. 11.

Figure 11:
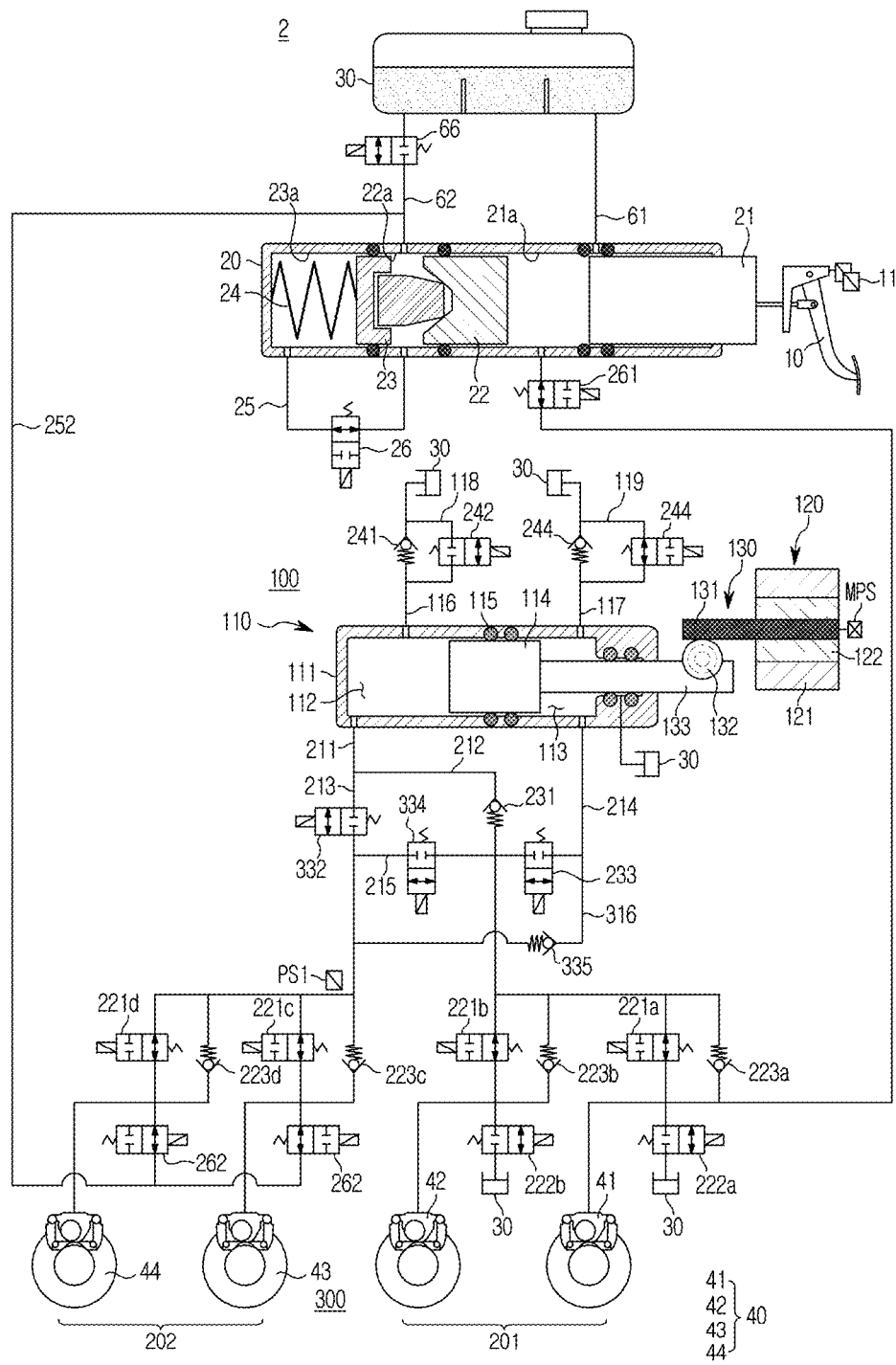
FIG. 11 is a hydraulic circuit diagram illustrating an electronic brake system according to a second embodiment of the present disclosure.

FIG. 11 is a hydraulic circuit diagram illustrating the electronic brake system 2 according to a second embodiment of the present disclosure.

Referring to FIG. 11, the electronic brake system 2 may include an integrated master cylinder 20 to pressurize and discharge a brake fluid (e.g., brake fluid) included therein according to a pedal effort of a brake pedal 10 depressed by a driver of a vehicle as well as to provide the driver with reaction force corresponding to a pedal effort of the brake pedal 10, a reservoir 30 formed to communicate with the master cylinder 20 to store the brake fluid, one or more wheel cylinders 40 to perform braking of respective wheels RR, RL, FR, and FL upon receiving hydraulic pressure generated by the brake fluid, a hydraulic-pressure supply device 100 to generate hydraulic pressure of a brake fluid by mechanically operating upon receiving an electrical signal indicating the driver's braking intention from a pedal displacement sensor 11 sensing displacement of the brake pedal 10, a hydraulic control unit to control hydraulic pressure applied to the wheel cylinders 40, and an electronic control unit (ECU) (not shown) to control the hydraulic-pressure supply device 100 and various valves based on hydraulic pressure information and pedal displacement information.

In the following description of the electronic brake system 2 according to the second embodiment of the present disclosure, the remaining reference numbers other than separate reference numbers different from those of the electronic brake system 1 are identical to those of the electronic brake system 1 according to the first embodiment, and as such a detailed description thereof will herein be omitted to avoid redundant description thereof.

The hydraulic control unit 300 may be provided to control hydraulic pressure to be transmitted to the wheel cylinders 40.

The first hydraulic passage 211 may be provided to connect the first pressure chamber 112 to the first and second hydraulic circuits 201 and 202. The first hydraulic passage 211 may be branched into a second hydraulic passage 212 communicating with the first hydraulic circuit 201 and a third hydraulic passage 213 communicating with the second hydraulic circuit 202. As a result, hydraulic pressure produced in the first pressure chamber 112 by forward movement of the hydraulic piston 114 may be transmitted to the first hydraulic circuit 201 and the second hydraulic circuit 202 through the second hydraulic passage 212 and the third hydraulic passage 213.

A first control valve 231 to control flow of a brake fluid may be provided in the second hydraulic passage 212. The first control valve 231 may be provided as a check valve that allows the brake fluid to flow from the first pressure chamber 112 to the first hydraulic circuit 201 and prevents the brake fluid from flowing from the first hydraulic circuit 201 to the first pressure chamber 112. That is, the first control valve 231 may allow hydraulic pressure produced in the first pressure chamber 112 to flow into the first hydraulic circuit 201, and may prevent hydraulic pressure produced in the first and second hydraulic circuits 201 and 202 from leaking to the first pressure chamber 112 through the second hydraulic passage 212.

A second control valve 332 to control flow of a brake fluid may be provided in the third hydraulic passage 213. The second control valve 332 may be implemented as a bidirectional control valve to control flow of the brake fluid flowing along the third hydraulic passage 213 communicating the first pressure chamber 112. The second control valve 332 may be implemented as a normally closed (NC) solenoid valve that remains closed in a normal state and is then open upon receiving an electrical signal from the ECU.

The fourth hydraulic passage 214 may be provided to interconnect the second pressure chamber 113 to the first hydraulic circuit 201. To this end, one end of the fourth hydraulic passage 214 may communicate with the second pressure chamber 113, and the other end of the fourth hydraulic passage 214 may communicate with the rear end of the first control valve 231 on the second hydraulic passage 212. One end of the fifth hydraulic passage 215 may be connected to the rear end of the first control valve 231 on the second hydraulic passage 212, and the other end of the fifth hydraulic passage 215 may be connected to the rear end of the second control valve 332 of the third hydraulic passage 213, such that the second hydraulic passage 212 may be connected to the third hydraulic passage 213. In addition, the sixth hydraulic passage 316 may be branched from the front end of the third control valve 233 on the fourth hydraulic passage 214 so as to interconnect the second pressure chamber 113 and the second hydraulic circuit 202, and may be linked to the rear end of the second control valve 332 on the third hydraulic passage 213.

The fourth hydraulic passage 214 may be provided with the third control valve 233 to control flow of the brake fluid.

The third control valve 233 may be implemented as a bidirectional valve to control flow of the brake fluid flowing along the fourth hydraulic passage 214 communicating the second pressure chamber 113. The third control valve 233 may be implemented as a normally closed (NC) solenoid valve that remains closed in a normal state and is then open upon receiving an electrical signal from the ECU.

The fifth hydraulic passage 215 may be provided with the fourth control valve 334 to control flow of the brake fluid.

The fourth control valve 334 may be implemented as a bidirectional control valve to control flow of the brake fluid flowing along the fifth hydraulic passage 215.

The fourth control valve 334 may be implemented as a normally closed (NC) solenoid valve that remains closed in a normal state and is then open upon receiving an electrical signal from the ECU.

The sixth hydraulic passage 216 may be provided with the fifth control valve 335 to control flow of the brake fluid.

The fifth control valve 335 may be provided as a check valve that allows the brake fluid to flow from the second pressure chamber 113 to the second hydraulic circuit 202 and prevents the brake fluid from flowing from the second hydraulic circuit 202 to the second pressure chamber 113. That is, the fifth control valve 335 may prevent hydraulic pressure of the second hydraulic circuit 202 from leaking to the second pressure chamber 113 through the sixth hydraulic passage 316, whereas the fifth control valve 335 may allow hydraulic pressure produced in the second pressure chamber 113 to flow into the second hydraulic circuit 202.

An electronic brake system 3 according to a third embodiment of the present disclosure will hereinafter be described with reference to FIG. 12.

Figure 12:
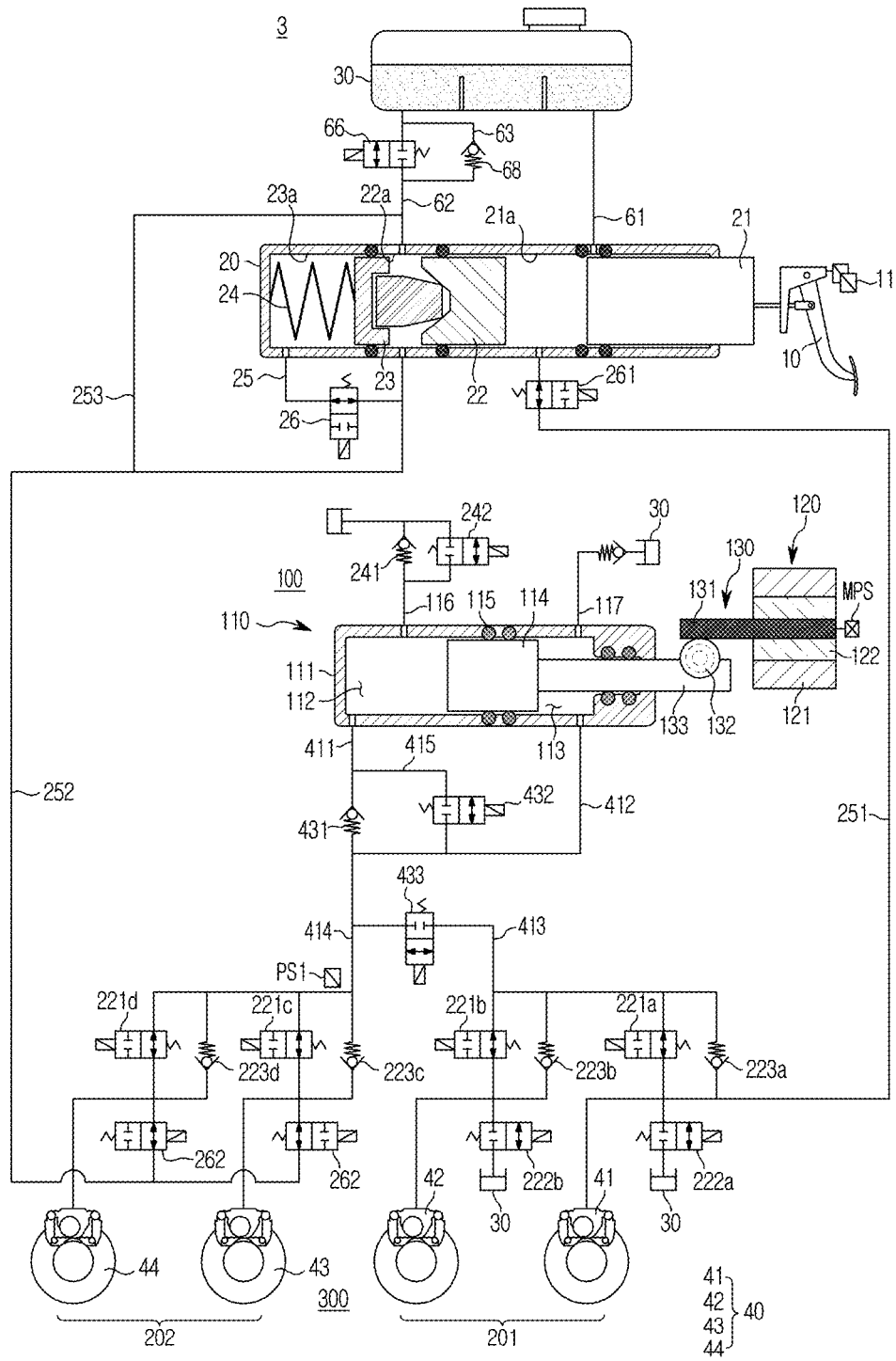
FIG. 12 is a hydraulic circuit diagram illustrating an electronic brake system according to a third embodiment of the present disclosure.

FIG. 12 is a hydraulic circuit diagram illustrating the electronic brake system 3 according to a third embodiment of the present disclosure.

Referring to FIG. 12, the electronic brake system 3 may include an integrated master cylinder 20 to pressurize and discharge a brake fluid (e.g., brake fluid) included therein according to a pedal effort of a brake pedal 10 depressed by a driver of a vehicle as well as to provide the driver with reaction force corresponding to a pedal effort of the brake pedal 10, a reservoir 30 formed to communicate with the master cylinder 20 to store the brake fluid, one or more wheel cylinders 40 to perform braking of respective wheels RR, RL, FR, and FL upon receiving hydraulic pressure generated by the brake fluid, a hydraulic-pressure supply device 100 to generate hydraulic pressure of a brake fluid by mechanically operating upon receiving an electrical signal indicating the driver's braking intention from a pedal displacement sensor 11 sensing displacement of the brake pedal 10, a hydraulic control unit to control hydraulic pressure applied to the wheel cylinders 40, and an electronic control unit (ECU) (not shown) to control the hydraulic-pressure supply device 100 and various valves based on hydraulic pressure information and pedal displacement information.

In the following description of the electronic brake system 3 according to the third embodiment of the present disclosure, the remaining reference numbers other than separate reference numbers different from those of the electronic brake system 1 are identical to those of the electronic brake system 1 according to the first embodiment, and as such a detailed description thereof will herein be omitted to avoid redundant description thereof.

The second reservoir passage 62 may be provided with a diagnostic valve 66 acting as a bidirectional control valve to control flow of a brake fluid received through the second reservoir passage 62. The diagnostic valve 66 may be implemented as a normally closed (NC) solenoid valve that remains closed in a normal state and is then open upon receiving an electrical signal from an electronic control unit (ECU). The second reservoir passage 62 may be provided with a bypass passage connected parallel to the diagnostic valve 66, and the bypass passage 63 may be provided with a check valve 68 configured to allow only unidirectional flow of the brake fluid. The check valve 68 may allow flow of the brake fluid received from the reservoir 30, and may prevent the brake fluid from flowing into the reservoir 30.

An auxiliary backup passage 253 may be branched from the front end of the diagnostic valve 66 on the second reservoir passage 26. The auxiliary backup passage 253 may be connected to the second backup passage 252, and a detailed description thereof will be given.

The simulation passage 25 may allow the first simulation chamber 22a and the second simulation chamber 23a to communicate with each other, and may be provided with the simulator valve 26 controlling flow of the brake fluid. The simulator valve 26 may be implemented as a normally open (NO) solenoid valve that remains open in a normal state and is then closed upon receiving an electrical signal from an electronic control unit (ECU).

The hydraulic control unit may be provided to control hydraulic pressure to be applied to the wheel cylinders 40, and the ECU may be provided to control the hydraulic-pressure supply device 100 and various valves based on hydraulic pressure information and pedal displacement information.

Referring to FIG. 12, the first hydraulic passage 411 may be provided to connect the first pressure chamber 112 to the first and second hydraulic circuits 201 and 202. The second hydraulic passage 412 may be provided to connect the second pressure chamber 113 to the first and second hydraulic circuits 201 and 202. The first hydraulic passage 411 and the second hydraulic passage 412 may be linked to each other, and may then be branched into a third hydraulic passage 413 communicating with the first hydraulic circuit 201 and a fourth hydraulic passage 414 communicating with the second hydraulic circuit 202. As a result, hydraulic pressure produced in the first pressure chamber 112 by forward movement of the hydraulic piston 114 may be transmitted to the first hydraulic circuit 201 through the first hydraulic passage 411 and the third hydraulic passage 413, and may be transmitted to the second hydraulic circuit 202 through the first hydraulic passage 411 and the fourth hydraulic passage 414. In addition, hydraulic pressure produced in the second pressure chamber 113 by backward movement of the hydraulic piston 114 may be transmitted to the first hydraulic circuit 201 through the second hydraulic passage 412 and the third hydraulic passage 413, and may be transmitted to the second hydraulic circuit 202 through the second hydraulic passage 412 and the fourth hydraulic passage 414.

A first control valve 431 to control flow of a brake fluid may be provided in the first hydraulic passage 411. The first control valve 431 may be provided as a check valve that allows the brake fluid to flow from the first pressure chamber 112 to the first and second hydraulic circuits 201 and 202 and prevents the brake fluid from flowing from the first hydraulic circuit 201 to the first and second pressure chambers 201 and 202. That is, the first control valve 431 may allow hydraulic pressure produced in the first pressure chamber 112 to flow into the first and second hydraulic circuits 201 and 202, and may prevent a hydraulic pressure produced in the first and second hydraulic circuits 201 and 202 from leaking to the first pressure chamber 112 through the second hydraulic passage 412.

A fifth hydraulic passage 415 may be provided to connect a front end of the first control valve 431 on the first hydraulic passage 411 to the second hydraulic passage 412. The fifth hydraulic passage 415 may be provided with a second control valve 432 controlling flow of a brake fluid. The second control valve 432 may be implemented as a bidirectional control valve to control flow of the brake fluid flowing between the first hydraulic passage 411 and the second hydraulic passage 412 through the fifth hydraulic passage 415. The second control valve 432 may be implemented as a normally closed (NC) solenoid valve that remains closed in a normal state and is then open upon receiving an electrical signal from the ECU.

A third control valve 433 may be provided at the rear end of a branch point from which the third and fourth hydraulic passages 413 and 414 are branched. The third control valve 433 may be disposed between the third and fourth hydraulic passages 413 and 414 so as to control flow of the brake fluid. The third control valve 433 may be implemented as a normally closed (NC) solenoid valve that remains closed in a normal state and is then open upon receiving an electrical signal from the ECU.

The first backup passage 251 may be provided with the first cut valve 261 controlling flow of the brake fluid, and the second backup passage 252 may be provided with at least one second cut valve 262 controlling flow of the brake fluid. In addition, an auxiliary backup passage 253 configured to assist communication between the first simulation chamber 22a and the second hydraulic circuit 202 may be branched from the second reservoir passage 62. The auxiliary backup passage 253 may be branched from the front end of the diagnostic valve 66 of the second reservoir passage 62, and may then be linked to the second backup passage 252.

An electronic brake system 4 according to a fourth embodiment of the present disclosure will hereinafter be described with reference to FIG. 13.

Figure 13:
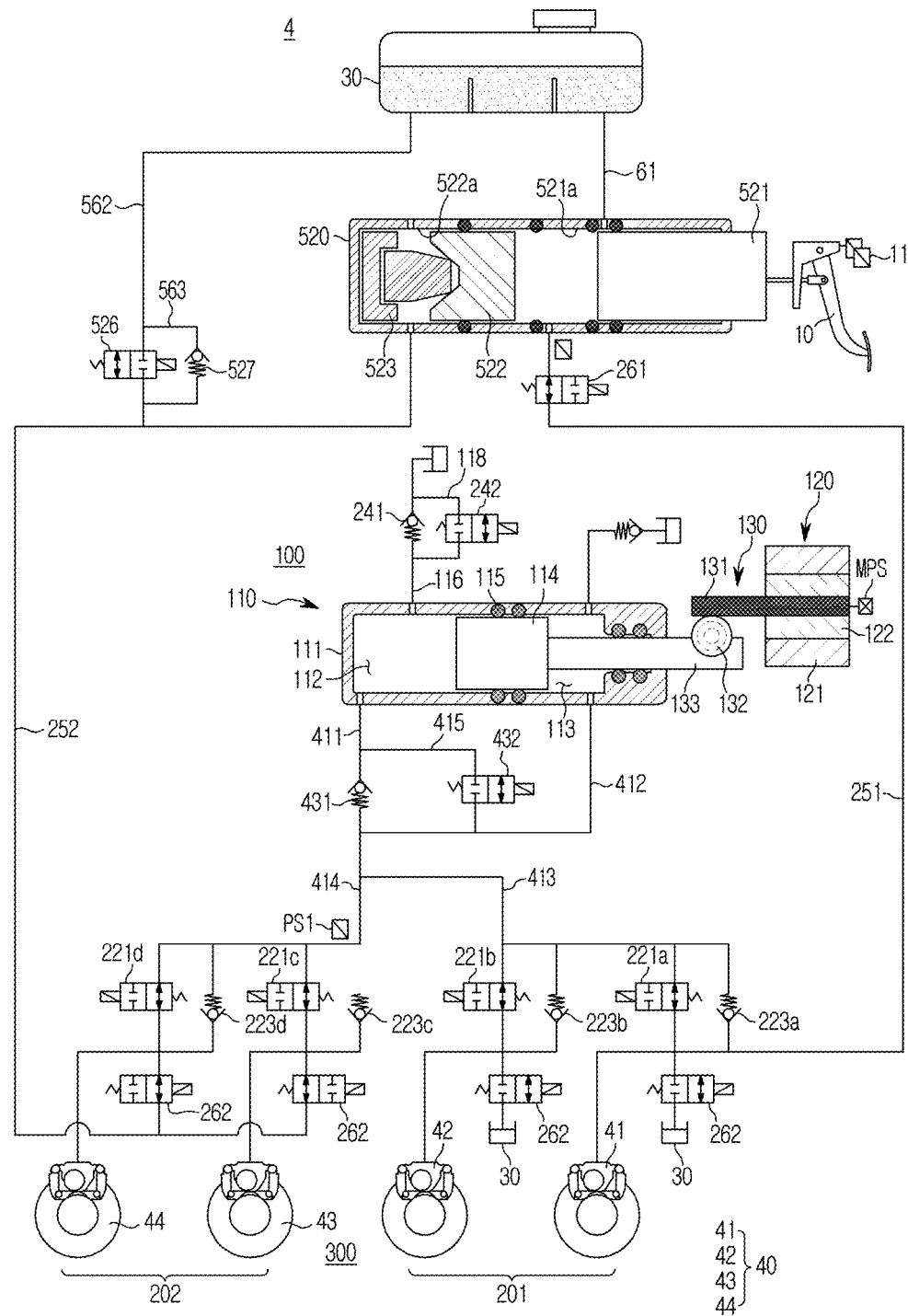
FIG. 13 is a hydraulic circuit diagram illustrating an electronic brake system according to a fourth embodiment of the present disclosure.

FIG. 13 is a hydraulic circuit diagram illustrating the electronic brake system 4 according to a fourth embodiment of the present disclosure.

Referring to FIG. 13, the electronic brake system 4 may include an integrated master cylinder 20 to pressurize and discharge a brake fluid (e.g., brake fluid) included therein according to a pedal effort of a brake pedal 10 depressed by a driver of a vehicle as well as to provide the driver with reaction force corresponding to a pedal effort of the brake pedal 10, a reservoir 30 formed to communicate with the master cylinder 20 to store the brake fluid, one or more wheel cylinders 40 to perform braking of respective wheels RR, RL, FR, and FL upon receiving hydraulic pressure generated by the brake fluid, a hydraulic-pressure supply device 100 to generate hydraulic pressure of a brake fluid by mechanically operating upon receiving an electrical signal indicating the driver's braking intention from a pedal displacement sensor 11 sensing displacement of the brake pedal 10, a hydraulic control unit to control hydraulic pressure applied to the wheel cylinders 40, and an electronic control unit (ECU) (not shown) to control the hydraulic-pressure supply device 100 and various valves based on hydraulic pressure information and pedal displacement information.

In the following description of the electronic brake system 4 according to the fourth embodiment of the present disclosure, the remaining reference numbers other than separate reference numbers different from those of the electronic brake system 1 are identical to those of the electronic brake system 1 according to the first embodiment, and as such a detailed description thereof will herein be omitted to avoid redundant description thereof.

An integrated master cylinder 520 may be configured to have a master chamber 521a and a simulation chamber 522a to pressurize and discharge the brake fluid provided therein, and provide the driver with reaction force corresponding to a pedal effort of the brake pedal 10.

In more detail, the integrated master cylinder 520 may include a master chamber 521*a*, a master piston 521 provided in the master chamber 521*a* to form displacement changeable by operation of the brake pedal 10, a restoring spring (not shown) to elastically support the master piston 521, a simulation chamber 522*a*, a reaction force piston 522 provided in the simulation chamber 522*a* and movable by hydraulic pressure of brake fluid stored in the master chamber 521*a*, a damping piston 523 movable by displacement of the reaction force piston 522, a reaction force spring 29 provided in the second simulation chamber 23*a* to elastically support the reaction force piston 22 and the damping piston 23, and a simulator valve 526 to control flow of the brake fluid stored in the simulation chamber 522*a*.

The master chamber 521*a* may include the master piston 521 connected to an input rod. The simulation chamber 522*a* may include the reaction force piston 522 and the damping piston 523. The master chamber 521*a* and the simulation chamber 522*a* may be sequentially disposed in the integrated master cylinder 520 in the operation direction of the brake pedal.

The master chamber 521*a* and the simulation chamber 522*a* may communicate with a hydraulic port through which brake fluid is input and output. In more detail, two hydraulic ports communicating with the master chamber 521*a* may be respectively connected to the first reservoir passage 61 and the first backup passage 251, and the simulation chamber 522*a* may be connected to the second backup passage 252 through a hydraulic port communicating with the second backup passage 252.

Meanwhile, the integrated master cylinder 520 according to the fourth embodiment of the present disclosure may include the master chamber 521*a* and the simulation chamber 522*a*, such that the integrated master cylinder 520 may secure safety in the event of malfunction. For example, the master chamber 521*a* may be connected to two wheels selected among from among the front right wheel FR, the front left wheel FL, the rear left wheel RL, and the rear right wheel RR, and the simulation chamber 522*a* may be connected to the remaining two wheels other than the selected wheels, such that braking of the vehicle remains possible even when one of the master chamber 521*a* and the simulation chamber 522*a* malfunctions. For example, the master chamber 521*a* may be connected to first and second wheel cylinders 41 and 42, and the simulation chamber 522*a* may be connected to third and fourth wheel cylinders 43 and 44.

A restoring spring (not shown) may be disposed between the master piston 521 and the reaction force piston 522 of the integrated master cylinder 520. The damping piston may be provided to be in contact with the end of the integrated master cylinder 520. The restoring spring may be compressed by the master piston 521 that moves in response to change in displacement of the brake pedal 10 depressed by the driver. When the driver takes a foot off the brake pedal 10 to release the pedal effort applied to the brake pedal 10, the restoring spring may be expanded by elastic force, such that the master piston 521 can move back to an original position thereof.

The master chamber 521*a* may be connected to the reservoir 30 through the first reservoir passage 61, and the simulation chamber 522*a* may be connected to the reservoir 30 through the second backup passage 252 and the second reservoir passage 562. The first reservoir passage 61 may be provided with a reservoir check valve (not shown) that allows a brake fluid to flow from the reservoir 30 to the master chamber 521*a* and prevents the brake fluid from flowing from the master chamber 521*a* to the reservoir 30.

In another example, the master chamber 521*a* may use a sealing member (to be described later) without using such a reservoir check valve, such that the master chamber 521*a* need not include the reservoir check valve therein and can also obtain the same results as in the reservoir check valve even when using the sealing member.

The second reservoir passage 562 may be branched from the second backup passage 252 connected to the simulation chamber 522*a*, and may be connected to the reservoir 30. The second reservoir passage 562 may be provided with the simulator valve 526 configured to control a simulation operation of the brake pedal.

The reaction force piston 522 may be installed to have a predetermined range of displacement within the simulation chamber 522*a* by hydraulic pressure of the brake fluid pressurized by the master chamber 521*a*. The damping piston 523 may be compressively deformed in response to movement of the reaction force piston 522. The damping piston 523 may include a support member 523*b* supported by the end of the integrated master cylinder 520, and an elastic member 523*c* disposed between the reaction force piston 522 and the support member 523*b*. The elastic member 523*c* may be disposed between the reaction force piston 522 and the support member 523*b*, and may be formed of a material such as rubber that can be compressed or expanded by displacement of the reaction force piston 522 and the support member 523*b*.

The simulator valve 526 may be provided in the second reservoir passage 562 connected to the simulation chamber 522*a*. The simulator valve 526 may be implemented as a normally closed (NC) solenoid valve that remains closed in a normal state and is then open upon receiving an electrical signal from an electronic control unit (ECU). In addition, the second reservoir passage 562 may be provided with a bypass passage 563 connected parallel to the simulator valve 522, and the bypass passage 563 may be provided with a check valve 527 configured to allow only unidirectional flow of the brake fluid. The check valve 627 may allow flow of the brake fluid received from the reservoir 30, and may prevent the brake fluid from flowing into the reservoir 30.

A detailed description of the pedal simulation operation by the integrated master cylinder 520 is as follows. In a normal operation mode, when a pedal effort is applied to the brake pedal 10 depressed by the driver of the vehicle, the first cut valve 261 provided in the first backup passage 251 is closed and the second cut valve 262 provided in the second backup passage 252 is also closed, and the simulator valve 526 provided in the second reservoir passage 526 is open. The master piston 522 moves in response to displacement of the brake pedal so that the brake fluid stored in the master chamber 521*a* is pressurized, hydraulic pressure of the pressurized brake fluid is transmitted in a forward direction (i.e., a right side of the reaction force when viewed from FIG. 13) of the reaction force piston 522, such that displacement may occur in the reaction force piston 522. As a result, the elastic member 523*c* may be compressed by displacement of the reaction force piston 522, and elastic restoring force may occur by such compression of the elastic member 523*c*, resulting in formation of proper pedal feel for the driver. In this case, the brake fluid stored in the simulation chamber 522*a* may be transmitted to the reservoir 30 through the second reservoir passage 562. Thereafter, when the driver takes a foot off the brake pedal 10 to release the pedal effort applied to the brake pedal 10, a restoring spring (not shown) and the elastic member 523*c* may be expanded by elastic restoring force such that the reaction force piston 522 and the master piston 521 can move back to original positions thereof. The simulation chamber 522a may receive the brake fluid through the second reservoir passage 562 so that the simulation chamber 522a may be filled with the received brake fluid.

In contrast, when the electronic brake system 1 abnormally operates (i.e., when the electronic brake system 1 operates in the fallback mode), the integrated master cylinder 620 may operate as follows. The master piston 521 moves forward by movement of the brake pedal 10 depressed by the driver, and the brake fluid stored in the master chamber 521a is pressurized by such movement of the master piston 521. The brake fluid pressurized by the master chamber 521a may be transmitted to the wheel cylinders 40 through the first backup passage 251, resulting in braking of the vehicle. In addition, the brake fluid pressurized by the master chamber 521a may allow the reaction force piston 522 to move forward, and the elastic member 523c may be compressed by forward movement of the reaction force piston 522, such that the brake fluid stored in the simulation chamber 522a may be transmitted to the wheel cylinders 40 through the second backup passage 252. In this case, the simulator valve 526 provided in the second reservoir passage 562 may be controlled to remain in a non-operation state so that the simulator valve 526 is closed, such that the entirety of the brake fluid discharged from the simulation chamber 522a may be supplied to the second backup passage 252. Thereafter, when the driver takes a foot off from the brake pedal 10 to release the pedal effort applied to the brake pedal 10, the restoring spring (not shown) and the elastic member 523c may be expanded by elastic force such that the reaction force piston 522 and the master piston 521 can move back to original positions thereof. The simulation chamber 522a may receive the brake fluid through the second backup passage 252 so that the simulation chamber 522a may be filled with the received brake fluid.

The hydraulic control unit may be provided to control hydraulic pressure to be applied to the wheel cylinders 40, and the ECU may be provided to control the hydraulic-pressure supply device 100 and various valves based on hydraulic pressure information and pedal displacement information.

Referring to FIG. 13, the first hydraulic passage 411 may be provided to connect the first pressure chamber 112 to the first and second hydraulic circuits 201 and 202. The second hydraulic passage 412 may be provided to connect the second pressure chamber 113 to the first and second hydraulic circuits 201 and 202. The first hydraulic passage 411 and the second hydraulic passage 412 may be linked to each other, and may then be branched into a third hydraulic passage 413 communicating with the first hydraulic circuit 201 and a fourth hydraulic passage 414 communicating with the second hydraulic circuit 202. As a result, hydraulic pressure produced in the first pressure chamber 112 by forward movement of the hydraulic piston 114 may be transmitted to the first hydraulic circuit 201 through the first hydraulic passage 411 and the third hydraulic passage 413, and may be transmitted to the second hydraulic circuit 202 through the first hydraulic passage 411 and the fourth hydraulic passage 414. In addition, hydraulic pressure produced in the second pressure chamber 113 by backward movement of the hydraulic piston 114 may be transmitted to the first hydraulic circuit 201 through the second hydraulic passage 412 and the third hydraulic passage 413, and may be transmitted to the second hydraulic circuit 202 through the second hydraulic passage 412 and the fourth hydraulic passage 414.

A first control valve 431 to control flow of a brake fluid may be provided in the first hydraulic passage 411. The first control valve 431 may be provided as a check valve that allows the brake fluid to flow from the first pressure chamber 112 to the first and second hydraulic circuits 201 and 202 and prevents the brake fluid from flowing from the first hydraulic circuit 201 to the first and second pressure chambers 201 and 202. That is, the first control valve 431 may allow hydraulic pressure produced in the first pressure chamber 112 to flow into the first and second hydraulic circuits 201 and 202, and may prevent a hydraulic pressure produced in the first and second hydraulic circuits 201 and 202 from leaking to the first pressure chamber 112 through the second hydraulic passage 412.

A fifth hydraulic passage 415 may be provided to connect a front end of the first control valve 431 on the first hydraulic passage 411 to the second hydraulic passage 412. The fifth hydraulic passage 415 may be provided with a second control valve 432 controlling flow of a brake fluid. The second control valve 432 may be implemented as a bidirectional control valve to control flow of the brake fluid flowing between the first hydraulic passage 411 and the second hydraulic passage 412 through the fifth hydraulic passage 415. The second control valve 432 may be implemented as a normally closed (NC) solenoid valve that remains closed in a normal state and is then open upon receiving an electrical signal from the ECU.

The first hydraulic circuit 201 and the second hydraulic circuit 202 of the hydraulic control unit 200 will hereinafter be described with reference to the attached drawings.

The first hydraulic circuit 201 may control hydraulic pressure of the first and second wheel cylinders 41 and 42 installed in two wheels selected from among four wheels RR, RL, FR, and FL, and may control hydraulic pressure of the third and fourth wheel cylinders 43 and 44 installed in the remaining two wheel cylinders other than the selected wheels.

The first hydraulic circuit 201 may receive hydraulic pressure from the hydraulic-pressure supply device 100 through the third hydraulic passage 413, and the second hydraulic circuit 202 may receive hydraulic pressure from the hydraulic-pressure supply device 100 through the fourth hydraulic passage 414.

The second backup passage 252 may be linked to rear ends or downstream sides of the third and fourth inlet valves 221c and 221d for the third and fourth wheel cylinders 43 and 44. The second backup passage 252 may be provided with the second cut valve 252 controlling flow of the brake fluid. In addition, the second hydraulic circuit 202 may include third and fourth outlet valves 222c and 222d connected to the reservoir 30 so as to improve performance or throughput when braking of the third and fourth wheel cylinders 43 and 44 is released. The third and fourth outlet valves 222c and 222d may be respectively connected to the third and fourth wheel cylinders 43 and 44 so as to control flow of the brake fluid discharged from the wheel cylinders 43 and 44. That is, the third and fourth outlet valves 222c and 222d may sense brake pressures of the third and fourth wheel cylinders 43 and 44. If decompression braking is needed, the third and fourth outlet valves 222c and 222d may be selectively open to control decompression of the wheel cylinders 43 and 44. The third and fourth outlet valves 222c and 222d may be implemented as normally closed (NC) solenoid valves that remain closed in a normal state and are then open upon receiving an electrical signal from the ECU.

As is apparent from the above description, the electronic brake system according to the embodiments of the present disclosure may reduce the number of constituent components by implementing an integrated master cylinder, resulting in implementation of a product having a smaller size and a light weight.

The electronic brake system according to the embodiments of the present disclosure may efficiently brake a vehicle in various driving situations.

The electronic brake system according to the embodiments of the present disclosure may stably generate high brake pressure.

The electronic brake system according to the embodiments of the present disclosure may improve performance and operational stability of a product.

The electronic brake system according to the embodiments of the present disclosure may provide stable brake pressure in a failure or abnormal state of constituent components or in a leakage state of a brake fluid.

The electronic brake system according to the embodiments of the present disclosure may improve durability of a product by reducing load applied to constituent components of the product.

The electronic brake system according to the embodiments of the present disclosure may improve ease of assembly and productivity of a product, resulting in reduction in product costs.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
a reservoir configured to store a brake fluid therein;
an integrated master cylinder connected to a brake pedal and including a master chamber and a master piston;
a hydraulic-pressure supply device configured to generate a hydraulic pressure by operating a hydraulic piston using an electrical signal that is output in response to a displacement of the brake pedal, and including a first pressure chamber disposed at one side of the hydraulic piston movably disposed in a cylinder block, and a second pressure chamber disposed at the other side of the hydraulic piston and connected to at least one of wheel cylinders;
a hydraulic control unit configured to include a first hydraulic circuit to control hydraulic pressure flowing from the hydraulic-pressure supply device to two of the wheel cylinders, and a second hydraulic circuit to control hydraulic pressure flowing from the hydraulic-pressure supply device to other two of the wheel cylinders;
a first dump passage configured to connect the first pressure chamber to the reservoir;
a second dump passage configured to connect the second pressure chamber to the reservoir;
a first dump valve provided in the first dump passage so as to control flow of the brake fluid; and
a second dump valve provided in the second dump passage so as to control flow of the brake fluid.

2. The electronic brake system according to claim 1, further comprising:
a first dump check valve connected parallel to the first dump valve on the first dump passage, and configured to allow only unidirectional flow of the brake fluid flowing from the reservoir to the first pressure chamber; and
a second dump check valve connected parallel to the second dump valve on the second dump passage, and configured to allow only unidirectional flow of the brake fluid flowing from the reservoir to the second pressure chamber.

3. The electronic brake system according to claim 1, wherein the hydraulic control unit includes:
a first hydraulic passage configured to communicate with the first pressure chamber;
second and third hydraulic passages branched from the first hydraulic passage and respectively connected to the first and second hydraulic circuits;
a fourth hydraulic passage configured to communicate with the second pressure chamber and connected to the second hydraulic passage;
a fifth hydraulic passage configured to connect the second hydraulic passage to the third hydraulic passage; and
a sixth hydraulic passage configured to connect the second hydraulic passage to the fifth hydraulic passage.

4. The electronic brake system according to claim 3, wherein the hydraulic control unit includes:
a first control valve provided in the second hydraulic passage so as to control flow of the brake fluid;
a second control valve provided in the third hydraulic passage so as to control flow of the brake fluid;
a third control valve provided in the fourth hydraulic passage so as to control flow of the brake fluid;
a fourth control valve disposed between one point connected to the sixth hydraulic passage and another point connected to the second hydraulic passage on the fifth hydraulic passage; and
a fifth control valve provided in the sixth hydraulic passage.

5. The electronic brake system according to claim 4, wherein the hydraulic control unit further includes:
a seventh hydraulic passage configured to communicate with the second pressure chamber and connected to the third hydraulic passage; and
a sixth control valve provided in the seventh hydraulic passage.

6. The electronic brake system according to claim 5, wherein:
each of the third to fifth control valves is provided as a solenoid valve controlling bidirectional flow of the brake fluid;
the first control valve is provided as a check valve that allows only flow of the brake fluid flowing from the first pressure chamber to the first hydraulic circuit;
the second control valve is provided as a check valve that allows only flow of the brake fluid flowing from the first pressure chamber to the second hydraulic circuit; and
the sixth control valve is provided as a check valve that allows only flow of the brake fluid flowing from the second pressure chamber to the second hydraulic circuit.

7. The electronic brake system according to claim 1, wherein:
the master piston is provided in the master chamber and configured to form provide displacement changeable by the brake pedal, and
the integrated master cylinder further includes
first and second simulation chambers;

a reaction force piston provided in the first simulation chamber to provide displacement changeable by hydraulic pressure of the brake fluid stored in the master chamber;
a damping piston provided in the second simulation chamber and configured to provide displacement changeable by the reaction force piston;
a simulation passage configured to allow the first simulation chamber to communicate with the second simulation chamber; and
a simulator valve provided in the simulation passage so as to control flow of the brake fluid;
wherein the damping piston includes a piston member configured to pressurize the second simulation chamber, and an elastic member disposed between the reaction force piston and the piston member.

8. The electronic brake system according to claim 7, further comprising:
a first backup passage configured to connect the master chamber to the first hydraulic circuit;
a second backup passage configured to connect the first simulation chamber to the second hydraulic circuit;
a first cut valve provided in the first backup passage so as to control flow of the brake fluid; and
a second cut valve provided in the second backup passage so as to flow of the brake fluid.

9. A method for operating an electronic brake system comprising a reservoir configured to store a brake fluid therein, an integrated master cylinder connected to a brake pedal and including a master chamber and a master piston, a hydraulic-pressure supply device configured to generate a hydraulic pressure by operating a hydraulic piston using an electrical signal that is output in response to a displacement of the brake pedal, and including a first pressure chamber disposed at one side of the hydraulic piston movably disposed in a cylinder block and a second pressure chamber disposed at the other side of the hydraulic piston and connected to at least one of the wheel cylinders, a hydraulic control unit configured to include a first hydraulic circuit to control hydraulic pressure flowing from the hydraulic-pressure supply device to two of the wheel cylinders, and a second hydraulic circuit to control hydraulic pressure flowing from the hydraulic-pressure supply device to other two of the wheel cylinders, a first dump passage configured to connect the first pressure chamber to the reservoir, a second dump passage configured to connect the second pressure chamber to the reservoir, a first dump valve provided in the first dump passage so as to control flow of the brake fluid, and a second dump valve provided in the second dump passage so as to control flow of the brake fluid, the method comprising:
performing a normal operation mode,
wherein the normal operation mode includes,
as hydraulic pressure of the brake fluid flowing from the hydraulic-pressure supply device to the wheel cylinders gradually increases,
performing a first braking mode configured to primarily provide hydraulic pressure,
performing a second braking mode configured to secondarily provide hydraulic pressure, and
performing a third braking mode configured to tertiarily provide hydraulic pressure.

10. The method according to claim 9, wherein the first braking mode includes:
closing the first dump valve to allow the hydraulic piston to move forward, such that hydraulic pressure produced in the first pressure chamber flows into the wheel cylinders after passing through the hydraulic control unit; and
opening the second dump valve to allow the brake fluid to flow from the reservoir to the second pressure chamber through the second dump passage.

11. The method according to claim 10, wherein the second braking mode includes:
closing the second dump valve to allow the hydraulic piston to move backward, such that hydraulic pressure produced in the second pressure chamber flows into the wheel cylinders after passing through the hydraulic control unit.

12. The method according to claim 11, wherein the third braking mode includes:
closing the first dump valve and the second dump valve;
moving the hydraulic piston forward such that some parts of the hydraulic pressure produced in the first pressure chamber flow into the wheel cylinders after passing through the hydraulic control unit; and
allowing the remaining hydraulic-pressure parts other than the some parts of the hydraulic pressure produced in the first pressure chamber to flow into the second pressure chamber after passing through the hydraulic control unit.

13. The method according to claim 10, further comprising:
releasing the first braking mode;
wherein the releasing of the first braking mode includes
closing the first dump valve to form negative pressure in the first pressure chamber by backward movement of the hydraulic piston such that the brake fluid provided to the wheel cylinders returns to the first pressure chamber after passing through the hydraulic control unit, and
opening the second dump valve to allow the brake fluid stored in the second pressure chamber to be discharged to the reservoir through the second dump passage.

14. The method according to claim 11, further comprising:
releasing the second braking mode;
wherein the releasing of the second braking mode includes
closing the second dump valve to form negative pressure in the second pressure chamber by forward movement of the hydraulic piston such that the brake fluid provided to the wheel cylinders returns to the second pressure chamber after passing through the hydraulic control unit, and
opening the first dump valve to allow the brake fluid stored in the first pressure chamber to be discharged to the reservoir through the first dump passage.

15. The method according to claim 12, further comprising:
releasing the third braking mode;
wherein the releasing of the third braking mode includes
closing the first dump valve to form negative pressure in the first pressure chamber by backward movement of the hydraulic piston such that the brake fluid provided to the wheel cylinders returns to the first pressure chamber after passing through the hydraulic control unit, and
allowing at least some parts of the brake fluid stored in the second pressure chamber to flow into the first pressure chamber after passing through the hydraulic control unit.

* * * * *